(12) United States Patent
Sawada et al.

(10) Patent No.: US 7,506,433 B2
(45) Date of Patent: Mar. 24, 2009

(54) APPARATUS AND METHOD FOR INSTALLING COCKPIT MODULE IN VEHICLE BODY

(75) Inventors: Yasuhiro Sawada, Kanagawa (JP); Shigenori Toyonaga, Kanagawa (JP); Kouichi Ohira, Kanagawa (JP); Toshifumi Inoue, Kanagawa (JP); Masashi Matsumoto, Kanagawa (JP); Masanobu Suzuki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/653,878

(22) Filed: Jan. 17, 2007

(65) Prior Publication Data

US 2007/0114709 A1    May 24, 2007

Related U.S. Application Data

(62) Division of application No. 11/056,175, filed on Feb. 14, 2005, now Pat. No. 7,168,145, which is a division of application No. 10/119,282, filed on Apr. 10, 2002, now Pat. No. 6,883,230.

(30) Foreign Application Priority Data

| Apr. 27, 2001 | (JP) | ............................. 2001-133508 |
| May 28, 2001 | (JP) | ............................. 2001-159344 |
| Nov. 16, 2001 | (JP) | ............................. 2001-352060 |

(51) Int. Cl.
*B23P 19/00*    (2006.01)

(52) U.S. Cl. ............................. 29/822; 29/791; 29/466; 29/468

(58) Field of Classification Search ................... 29/822, 29/783, 791, 281.4, 464, 466, 468, 271, 281.5; 296/70

See application file for complete search history.

(56) References Cited

U.S. PATENT DOCUMENTS

| 4,875,273 | A | * | 10/1989 | Yamamoto ................... 29/467 |
| 4,876,786 | A | * | 10/1989 | Yamamoto et al. ............ 29/429 |
| 5,082,078 | A | * | 1/1992 | Umeda et al. .................. 180/90 |
| 5,311,659 | A | * | 5/1994 | Barnhart et al. ............... 29/823 |
| 5,358,300 | A | * | 10/1994 | Gray ........................... 296/192 |
| 5,456,002 | A | * | 10/1995 | Barnhart et al. ............... 29/787 |
| 5,477,603 | A | * | 12/1995 | Kemichick ................... 29/468 |
| 5,479,698 | A | * | 1/1996 | Angel .......................... 29/701 |
| 5,996,207 | A | * | 12/1999 | Brown et al. .................. 29/464 |
| 6,481,077 | B1 | * | 11/2002 | Matsumoto et al. ........... 29/271 |
| 6,517,139 | B2 | | 2/2003 | Sutou et al. |

FOREIGN PATENT DOCUMENTS

DE    100 29 414 A1    2/2001

(Continued)

*Primary Examiner*—David P Bryant
*Assistant Examiner*—Christopher M Koehler
(74) *Attorney, Agent, or Firm*—Foley & Lardner LLP

(57) ABSTRACT

An installation apparatus is comprised of a pair of grasping brackets and an installation jig. The installation apparatus is employed to install a cockpit module in a vehicle body in a manner that the grasping brackets is detachably attached respectively to both end portions of a steering member of the cockpit module and that the installation jig grasps the grasping brackets and conveys the cockpit module to the vehicle body.

2 Claims, 27 Drawing Sheets

FOREIGN PATENT DOCUMENTS

| | | |
|---|---|---|
| JP | 3-243477 A | 10/1991 |
| JP | 4-143182 A | 5/1992 |
| JP | 6-199152 A | 7/1994 |
| JP | 8-318760 A | 12/1996 |
| JP | 10-67354 A | 3/1998 |
| JP | 11-254998 A | 9/1999 |
| JP | 2000-296726 A | 10/2000 |

* cited by examiner

FIG.5A                    FIG.5B
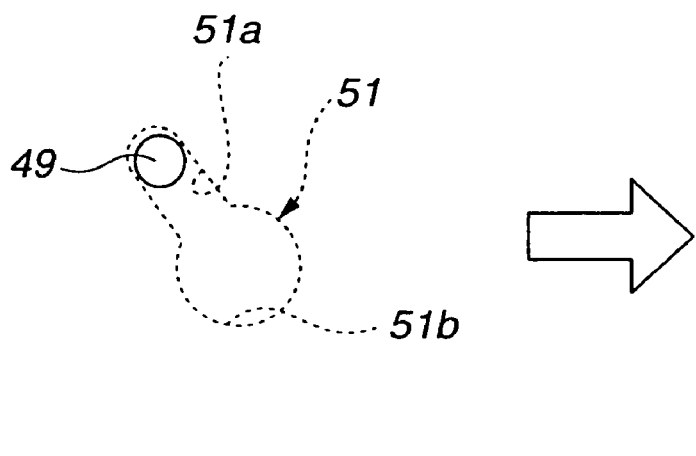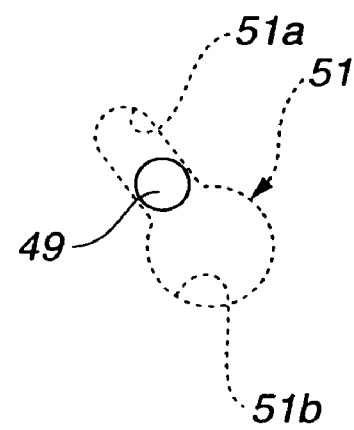

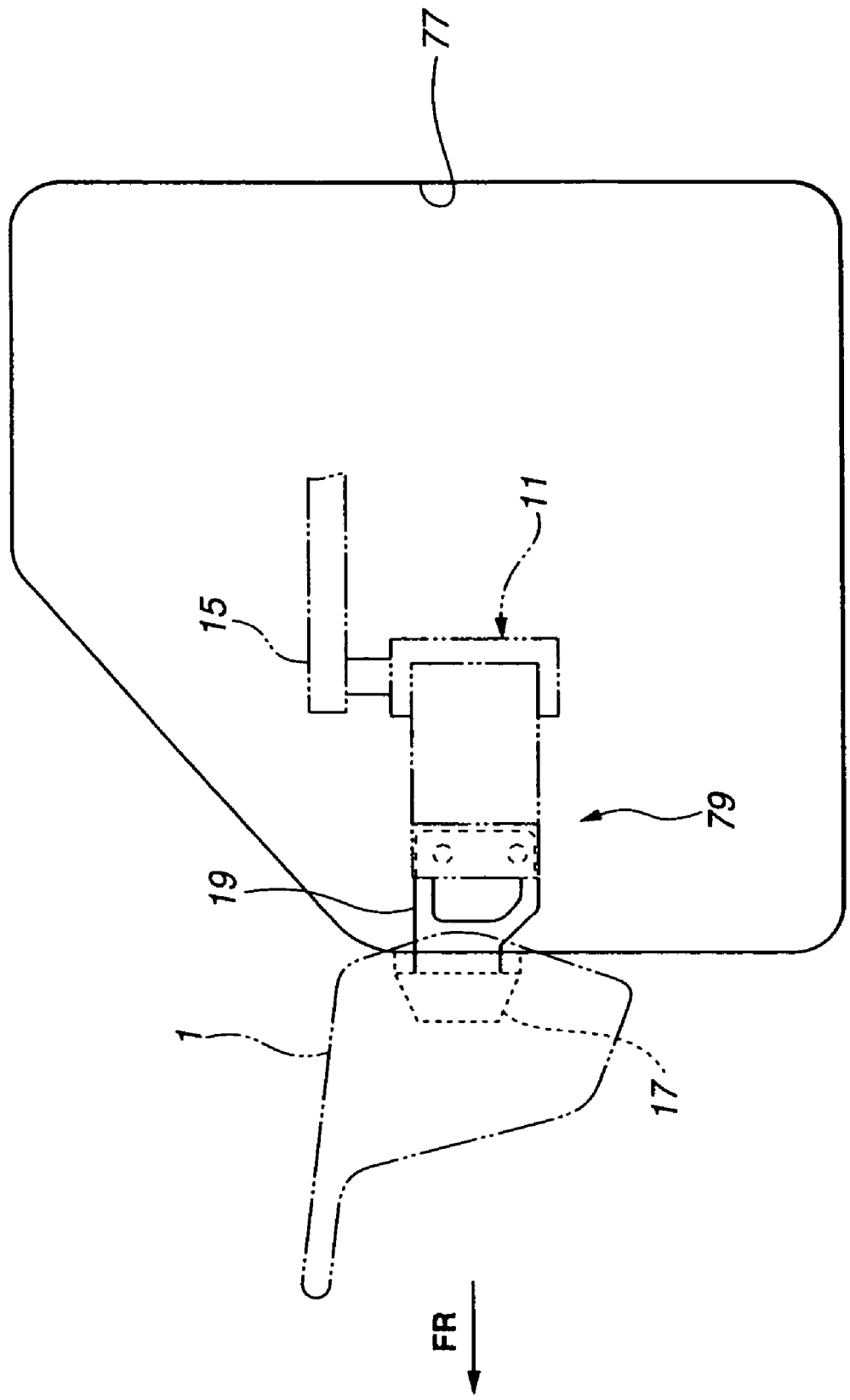

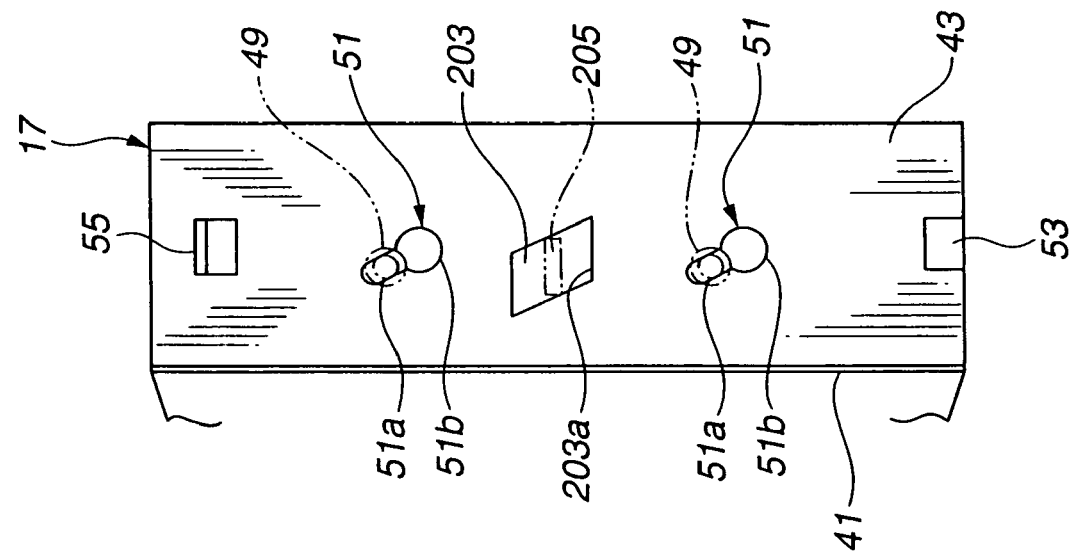
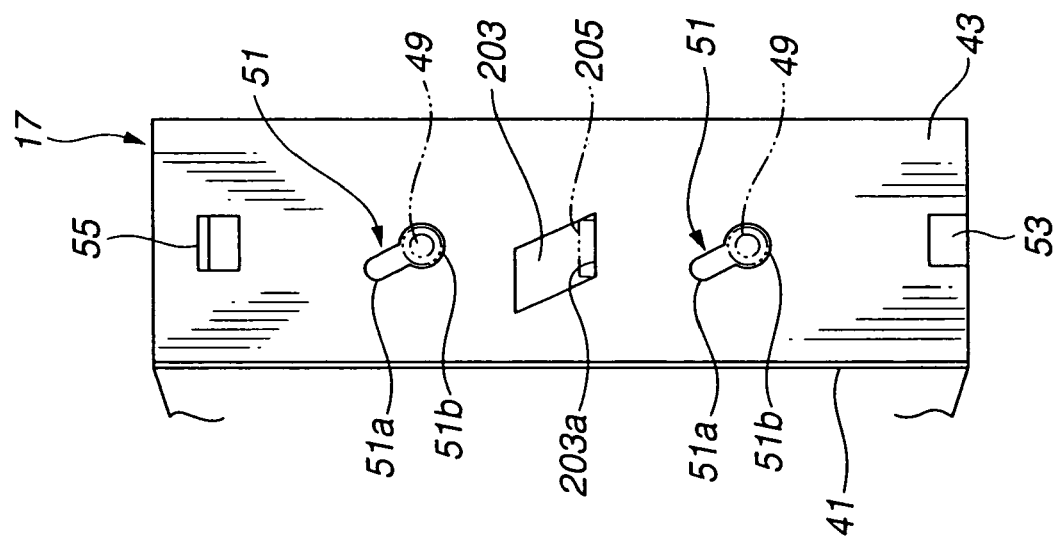

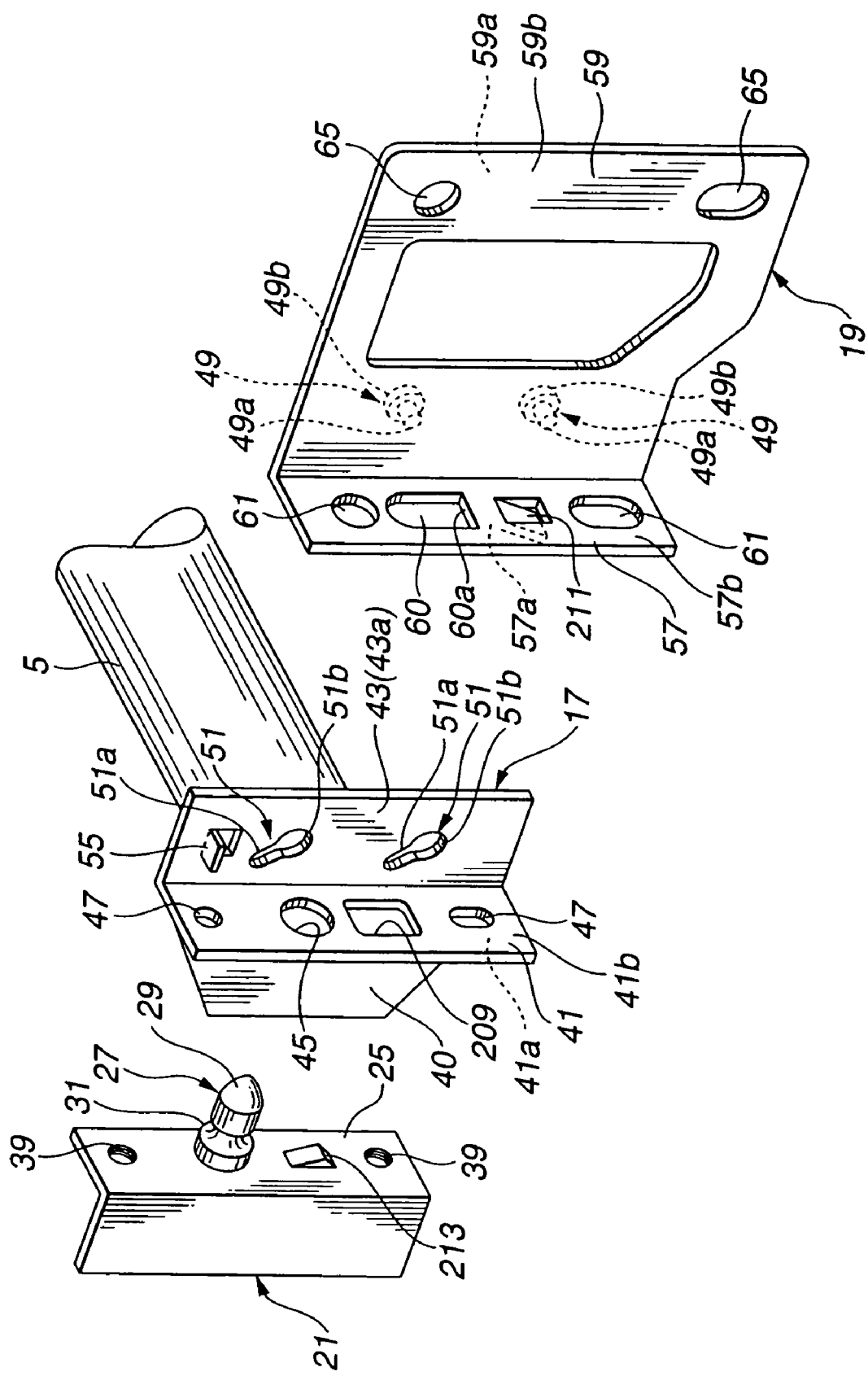

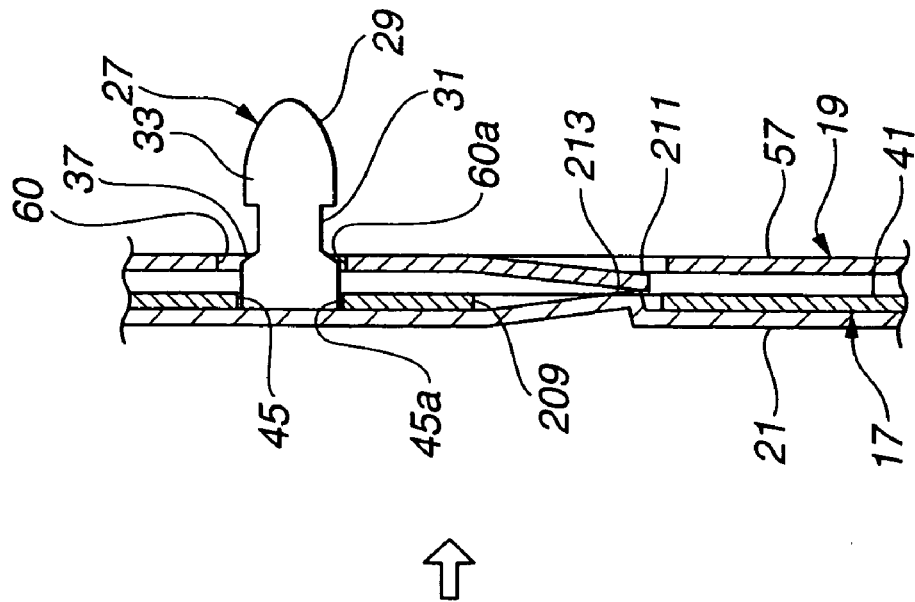
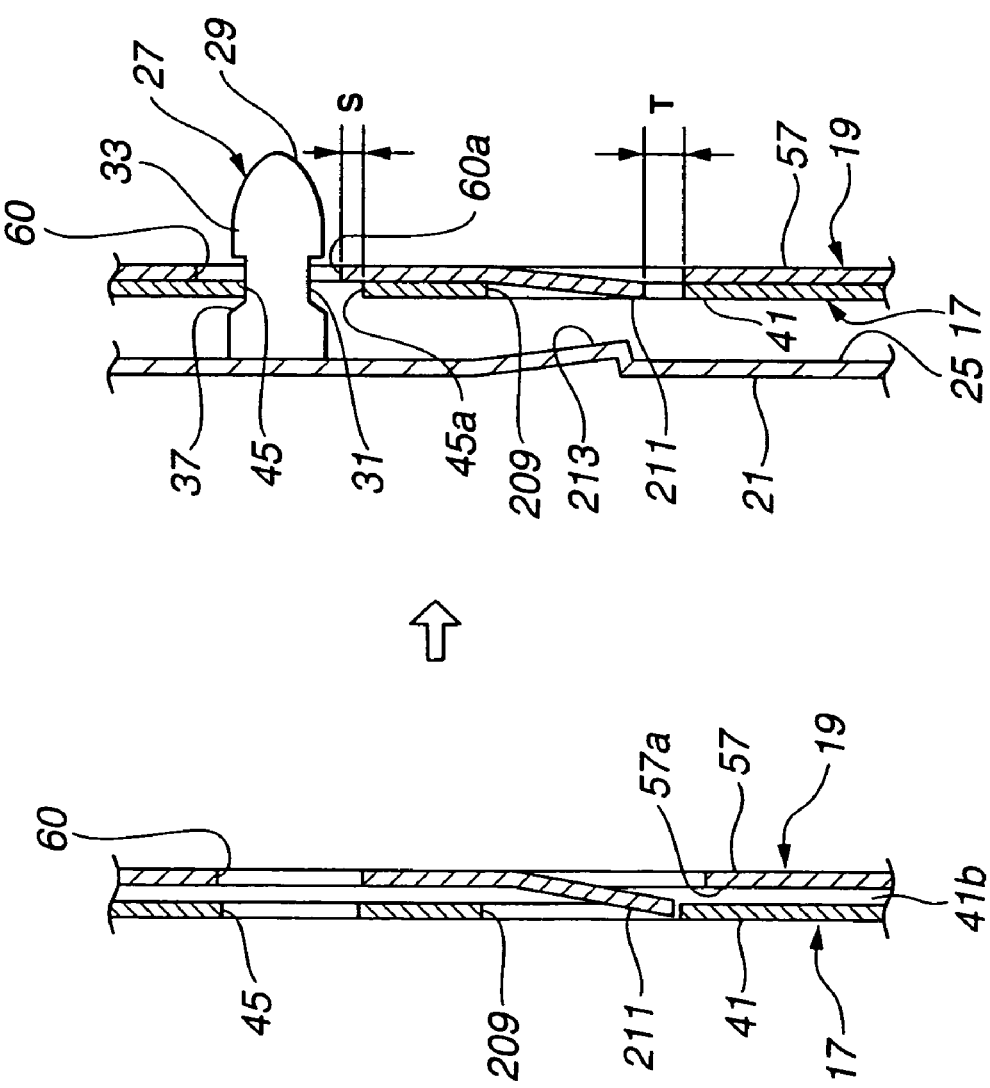

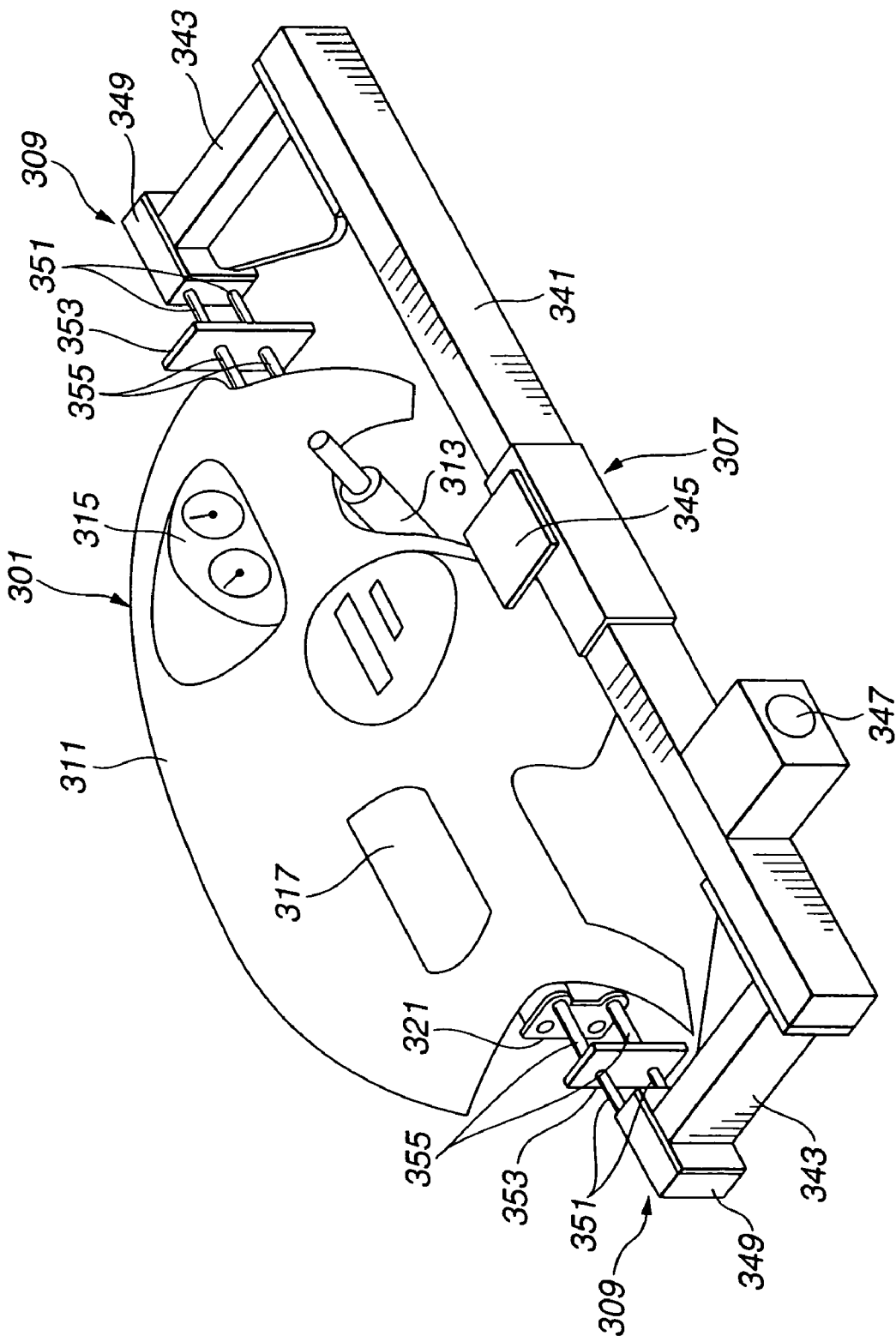

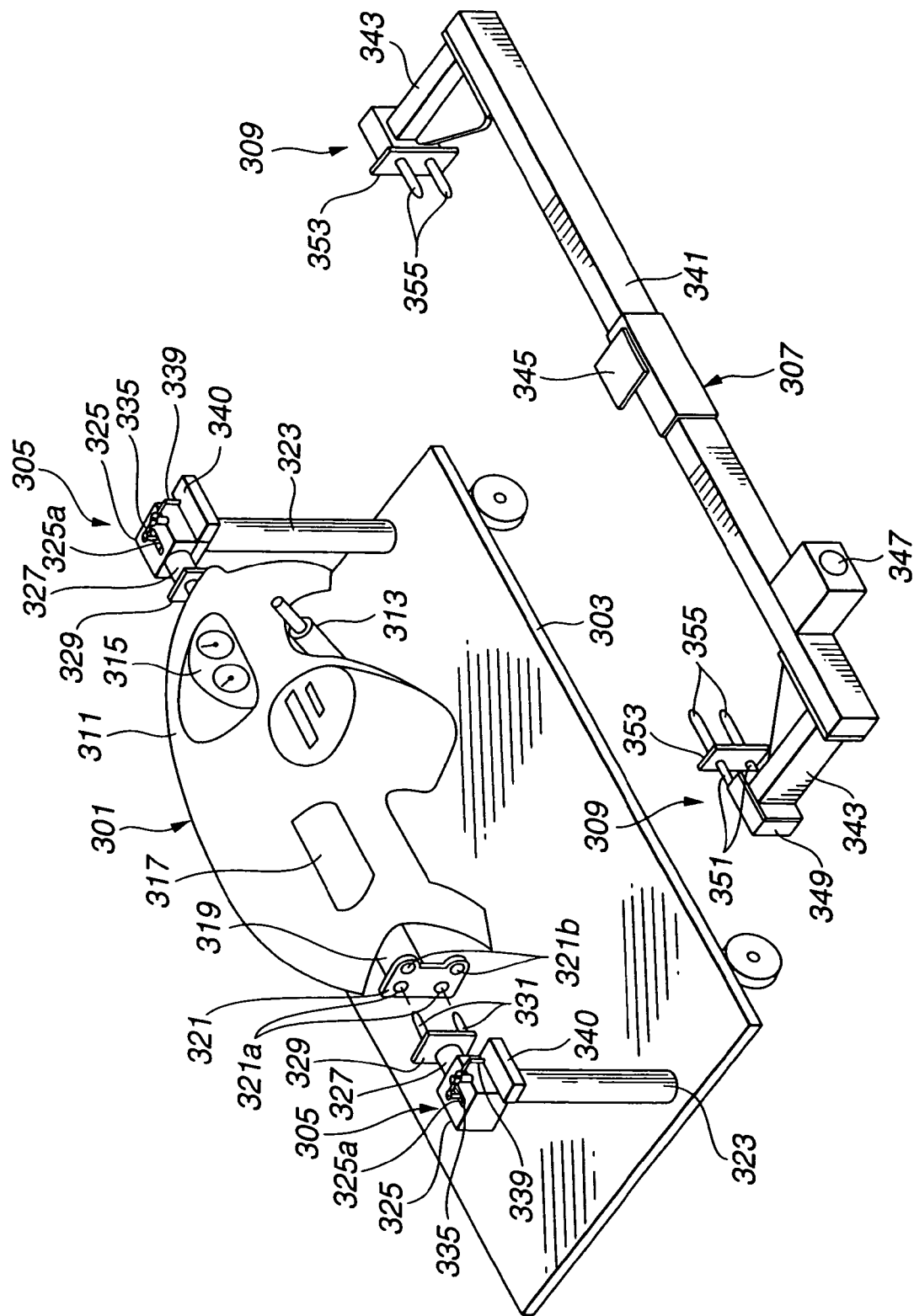

APPARATUS AND METHOD FOR INSTALLING COCKPIT MODULE IN VEHICLE BODY

The present application is a divisional of U.S. application Ser. No. 11/056,175, filed Feb. 14, 2005, which is a divisional of U.S. application Ser. No. 10/119,282, filed Apr. 10, 2002, the entire contents of both applications are incorporated herein by reference.

BACKGROUND OF THE INVENTION

The present invention relates to apparatus and method for installing a cockpit module in a vehicle body during a vehicle production process.

Various apparatuses and methods for installing a cockpit module in a vehicle body have been proposed, for example, in Japanese Patent Provisional Publications Nos. 11-254998, 10-67354, 8-318760, and 6-199152.

SUMMARY OF THE INVENTION

However, these proposed apparatuses and methods are required to enable an installation operation of a cockpit module to be further easily executed.

It is therefore an object of the present invention to provide an improved apparatus and method which is capable of easily installing a cockpit module in a vehicle body.

According to the present invention, an installation apparatus for installing a cockpit module in a vehicle body, comprising: an installation jig grasping the cockpit module to install the cockpit module in the vehicle body; and a pair of grasping brackets detachably attached to both end portions of a steering member of the cockpit module, each grasping bracket having a grasped portion which is grasped by the installation jig; wherein the grasped portion of the grasping bracket is located within an area of a front-door opening of the vehicle body which is viewed from a laterally outside direction of the vehicle body when the cockpit module is installed in the vehicle body.

An installation apparatus of a vehicle cockpit module according to the present invention, comprising: an installation jig for installing a cockpit module in a vehicle body, the installation jig comprising a pair of attachments which grasp both end portions of a steering member of the cockpit module by moving in the longitudinal direction of the vehicle body, the attachments being installed at both ends of an installation hand, respectively.

According to the present invention, a method of installing a cockpit module in a vehicle body, comprising: detachably attaching a pair of grasping brackets to both end portions of a steering member of the cockpit module, respectively; grasping a grasped portion of each grasping bracket by means of an installation jig; and installing the cockpit module in a vehicle body such that the grasping portions is located within an area of a front-door opening of the vehicle body when the front-door opening is viewed from a laterally outside direction of the vehicle body.

A work installation apparatus according to the present invention comprising: a work-supply jig supporting both ends of a work, the work-supply jig comprising a pair of supply-jig connecting portions connected with the work by bringing the supply-jig connecting portions nearer to the work from axially outer sides of the work, and an interlock portions operating in response to the approach of the supply-jig connecting portions to the work; and a work-installation jig grasping the work to install the work in an object, the work-installation jig comprising a releasing portion releasing the connection between the supply-jig connecting portions and the work through the interlock mechanism, and an installation-jig connecting portion connected with the work by bringing the installation-jig connecting portions nearer to the work from axially outer sides of the work in response to the releasing operation of the releasing portion.

Further, according to the present invention, a method of installing a work in an object, comprising: supporting the work by moving a pair of work-supply jigs toward the work from axially outer sides of the work; supporting the work by moving a pair of work-installation jigs toward the work from axially outer sides of the work; and releasing the work-supply jigs from the work when the work-installation jigs support the work.

The other objects and features of this invention will become understood from the following description with reference to the accompanying drawings.

BRIEF DESCRIPTION OF THE DRAWINGS

FIG. 5A is an explanatory view showing a positional relationship between a connecting pin and a connecting under the state of FIG. 4A, and FIG. 5B. is an explanatory view showing a positional relationship between a connecting pin and a connecting under the state of FIG. 4B.

FIG. 6 is an explanatory view showing a positional relationship of the cockpit module relative to a front-door opening of the vehicle body.

FIG. 13A is a side view showing the modification of FIG. 11 set in the state that the projection is in contact with the lower periphery of a guide hole.

FIG. 13B is a side view showing the modification of FIG. 11 set in the state that the connecting pin is inserted into a connecting hole.

FIG. 14 is a perspective view showing a modification of the first embodiment of the installation apparatus according to the present invention.

FIG. 15A is an explanatory view showing a drop restricting portion and a drop-restriction canceling portion set in a state that a restriction projection is connected to a restriction hole.

FIG. 15B is an explanatory view showing the drop restricting portion and the drop-restriction canceling portion set in a state that the cockpit module is provisionally supported by the vehicle body.

FIG. 15C is an explanatory view showing the drop restricting portion and the drop-restriction canceling portion set in a state that a drop-restriction is canceled by pushing the restriction projection by means of a press projection.

FIG. 27 is a perspective view showing a state that the work-installation jigs of installation hand grasp the cockpit module.

FIG. 29 is a perspective view showing a modification of the fourth embodiment shown in FIG. 25.

DETAILED DESCRIPTION OF THE INVENTION

Referring to FIGS. 1 to 17, there is shown a first embodiment of an installation apparatus of a cockpit module 1 for a vehicle in accordance with the present invention.

Figure 1:
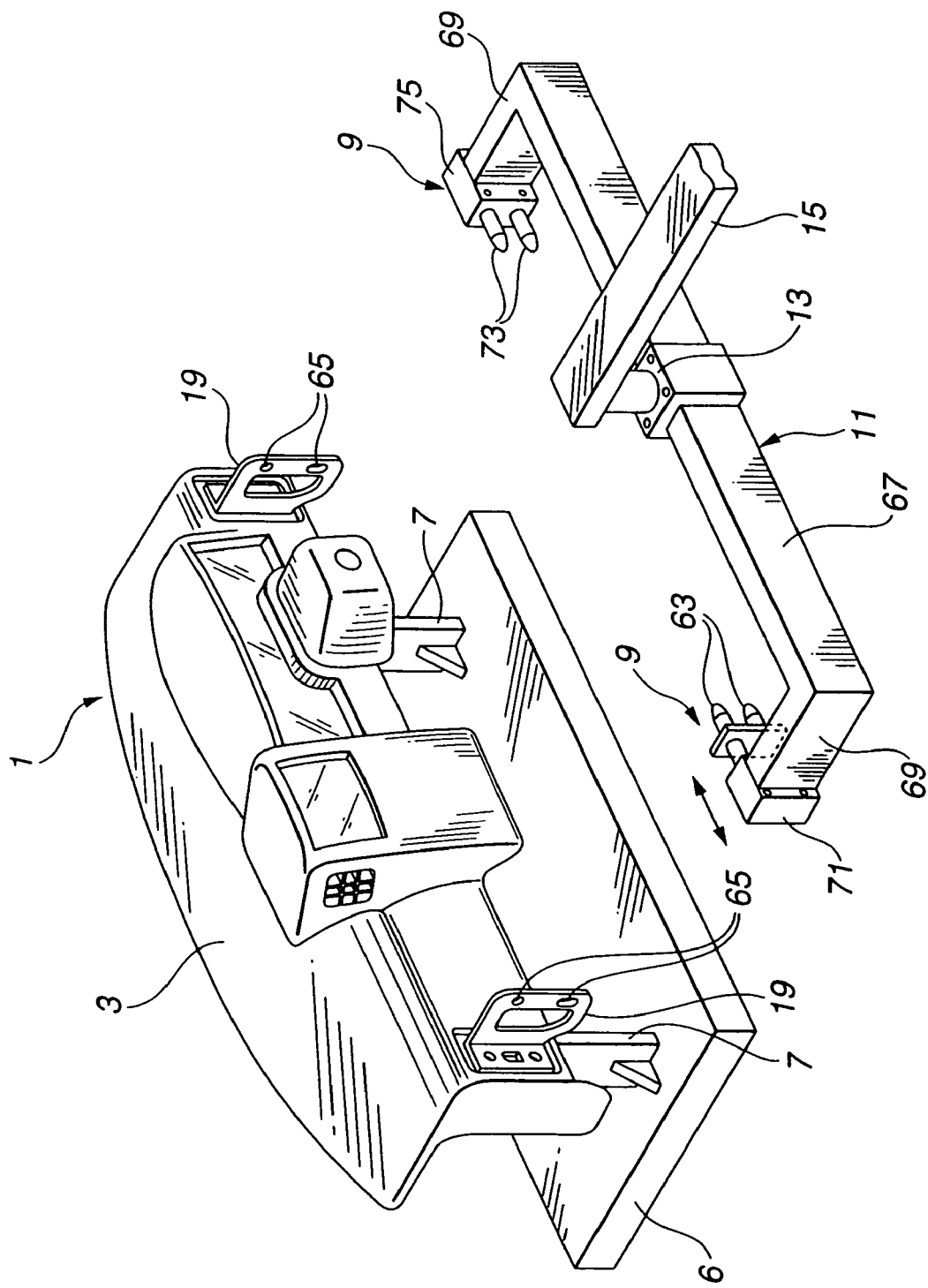
FIG. 1 is a perspective view showing an installation apparatus for installing a cockpit module in a vehicle body in according with a first embodiment of the present invention.

FIG. 1 is a perspective view showing the grasping structure according to the present invention. Cockpit module 1 is an assembly unit which is produced by assembling various parts including an instrument panel 3 around a steering member 5 extending in a lateral direction of a vehicle body. Steering member 5 is a reinforcement improves a supporting rigidity of a steering column. Steering member 5 extends in the lateral direction of the vehicle body and is secured to the lateral right and left sides of the vehicle body when cockpit module is installed in the vehicle body. Cockpit module 1 is set on a work mount table 6 disposed in the vicinity of a vehicle body conveying line. Two supporting posts 7 stand on work mount table 6. Upper end portions of two supporting posts 7 receive steering member 5.

Cockpit module 1 is installed in a vehicle body through an opening for a front door by means of an installation hand 11. Installation jigs 9 are installed at both right and left end portions thereof. An installation portion 13, which is located at a longitudinally center portion of installation hand 11, is installed at a tip end portion of an arm 15 of a robot or a power assist device, so as to move according to a teaching operation of the robot or to move according to an operator's operation of arm 15 installed in the power assist device.

Figure 2:
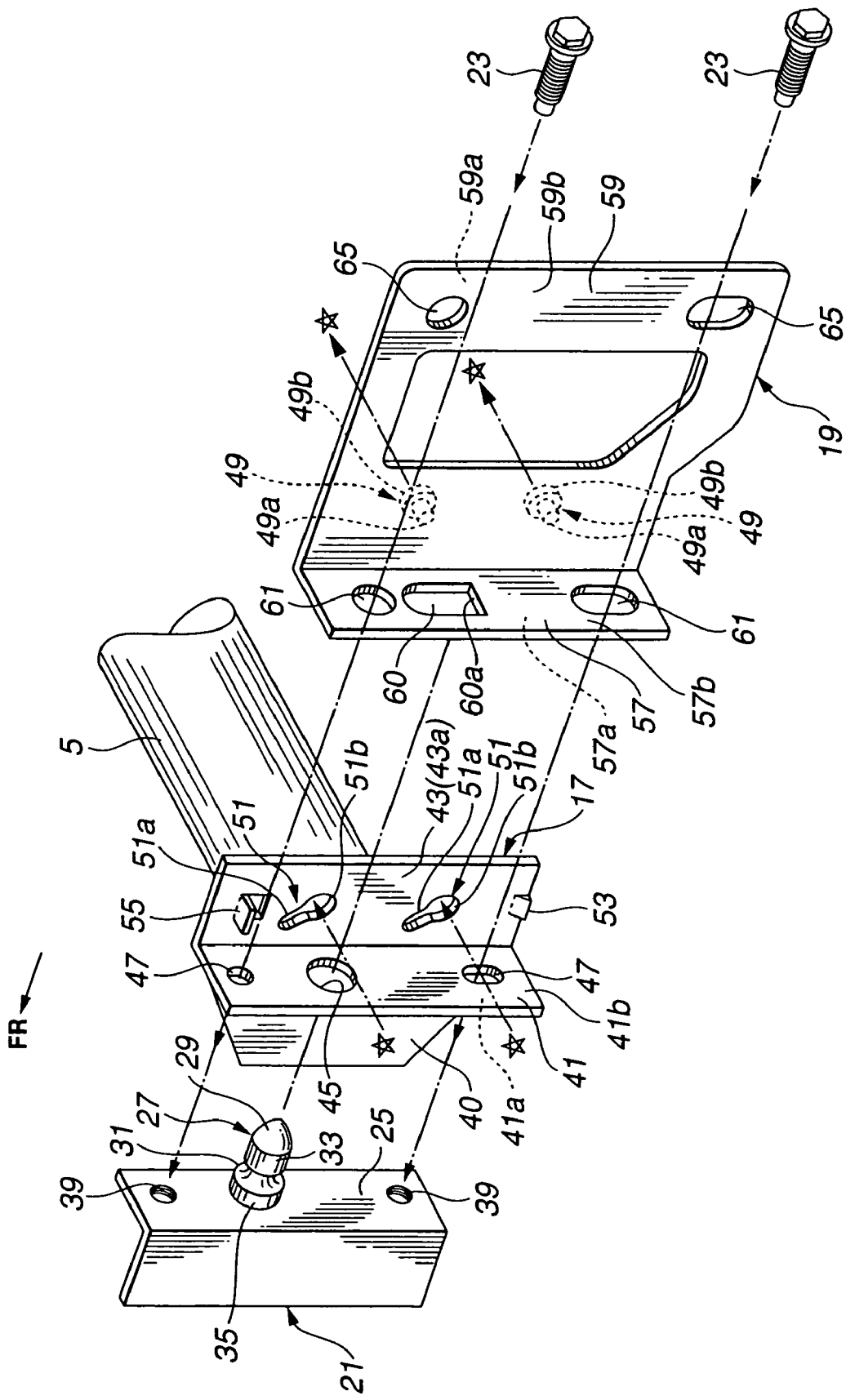
FIG. 2 is an exploded perspective view showing an essential part of the installation apparatus of FIG. 1.

Side brackets 17 are provided at both end portions of steering member 5, respectively. FIG. 2 shows a left-hand-side end portion of steering member 5 and left-hand-side side bracket 17. Under a condition that side brackets 17 are attached to steering member 5, installation jigs 9 grasp grasping brackets 19, respectively. Cockpit module 1 carried within the vehicle body is fixed on the vehicle body by tightening each side bracket 17 and each vehicle-body bracket 21 by means of two bolts 23. The arrow FR in FIG. 2 shows a direction of a front side of the vehicle body.

Each pair of side brackets 17, grasping brackets 19 and vehicle-body brackets 21 are respectively symmetrical. Therefore, only the explanation as to the left-hand-side elements thereof is basically discussed hereinafter.

As shown in FIG. 2, each vehicle-body bracket 21 has an L-shaped cross-section and has a fixing surface 25 directed to a backward direction of the vehicle body. A positioning pin 27 projects from fixing surface 25 in the backward direction, and performs a positioning function and a temporal supporting function.

Figure 4A:
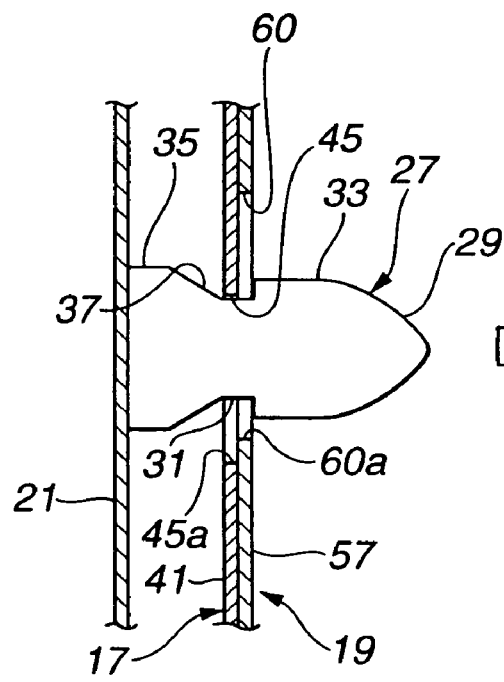
FIG. 4A is an explanatory view showing a state that the cockpit module is provisionally installed in a vehicle body.
Figure 4B:
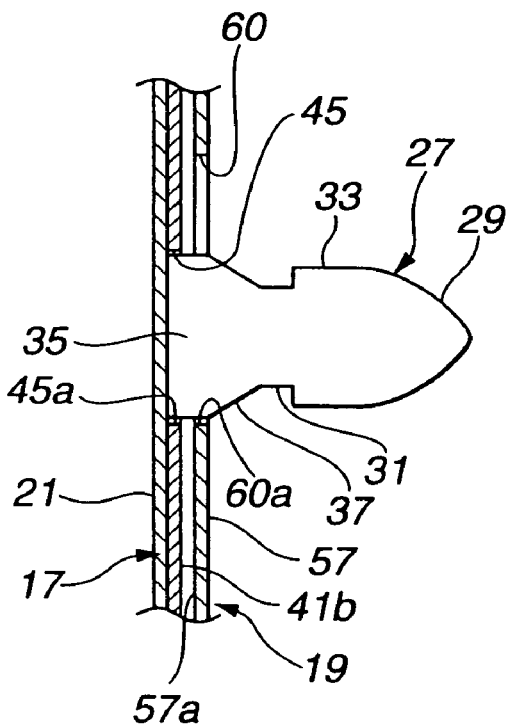
FIG. 4B is an explanatory view showing a state that the cockpit module is positioned at a correct position relative to the vehicle body.

As shown in FIGS. 4A and 4B, positioning pin 27 is constituted by a tapered tip portion 29, a guide portion 33, a neck portion 31, and a positioning portion 35. Tapered tip portion 29 is formed at an free end portion of positioning pin 27, a tapered portion 37 and neck portion 31 is formed at an intermediate portion of positioning pin 27. This neck portion 31 functions to temporally support cockpit module 1. Guide portion 33 is located between neck portion 31 and tapered tip portion 29. Positioning portion 35 is located in the vicinity of a fixed end of positioning pin 27. A diameter of positioning portion 35 is greater than that of guide portion 33. Tapered portion 37 is formed between neck portion 33 and positioning portion 35 so as to continuously connect therebetween.

Two threaded holes 39 are formed at upper and lower end portions of fixing surface 25 of vehicle-body bracket 21, respectively, in order to fix cockpit module 1 on vehicle-body bracket 21 by means of bolts 23.

Side bracket 17 has a connecting member 40 to which an axis portion of steering member 5 is connected. Further, side bracket 17 has a lateral plate 41 and a longitudinal plate 43 which are fixed to a backward peripheral portion of connecting member 40. Lateral plate 41 extends along a lateral direction of the vehicle body and has surfaces 41a and 41b which are faced with vehicle-body bracket 21 and grasping bracket 19, respectively. Longitudinal plate 43 extends along a longitudinal direction (fore-and-aft direction) of the vehicle body and is connected to an inner end portion of lateral plate 41 so as to form an L-shaped cross-section thereby. Longitudinal plate 43 of side bracket has a surface 43a faced with grasping bracket 19.

Lateral plate 41 has a positioning hole 45 to which positioning pin 27 is inserted. An inner diameter of positioning hole 45 is slightly greater than an outer diameter of positioning portion 35. By inserting positioning portion 35 of positioning pin 27 into positioning hole 45, cockpit module 1 is correctly positioned with respect to the vehicle body.

Two bolt holes 47 are formed at upper and lower end portions of lateral plate 41, respectively. Bolt hole 47 formed at the lower end portion is formed into a slot so as to absorb dimensional tolerances between vehicle-body bracket 21 and side bracket 17.

Longitudinal plate 43 has upper and lower connecting holes 51 through which two connecting pins 49 of grasping bracket 19 are connected to longitudinal plate 43. Connecting holes 51 are formed into slots which obliquely extend in the upward direction. More specifically, each connecting hole 51 is constituted by a large diameter hole 51b located at a lower side and a slotted portion 51a continuous with large diameter hole 51b.

An embossed portion 53 for preventing grasping bracket 19 from detachedly dropping is formed at a lower end of longitudinal plate 43. A projection 55 for restricting upward movement of grasping bracket 19 is formed at an upper portion of longitudinal plate 43 by deforming a part of longitudinal plate 43.

Grasping bracket 19 has a lateral plate 57 and a longitudinal plate 59 which integrally formed into an L-shape in cross-section. Lateral plate 57 has a guide hole 60 for correctly positioning grasping bracket 18 relative to side bracket 17. Guide hole 60 is a slot which extends in the vertical direction while adjusting its lower periphery 60a with a lower periphery of positing hole 45. Two work holes 61 are formed at upper and lower end portions of lateral plate 57, respectively, corresponding to bolt holes 47. Both work holes 61 have diameters which are greater than a diameter of a head portion of bolt 23, and lower work hole 61 is formed into a slot, so that grasping bracket 19 is easily detached from side bracket 17 after bolts 23 are tightened. Lateral plate 57 has a surface 57a which is contacted with surface 41b of lateral plate 41 of side bracket.

Two connecting pins 49 are fixed on an inner surface 59a of longitudinal plate 59 so as to project from inner surface 59a toward a center portion of the vehicle body. Each connecting pin 49 has a shaft portion 49a extending from longitudinal plate 59 and a large diameter end 49b formed at a free end of shaft portion 49a. An outer diameter of shaft portion 49a is slightly smaller than a smaller width of slotted portion 51a so as to be movable in slotted portion 51a. An outer diameter of large diameter portion 49b is slightly smaller than a diameter of large diameter hole 51b and is greater than a smaller width of slotted portion 51a. Accordingly, by inserting large diameter portion 49b into large diameter hole 51b and by upwardly moving shaft portion 49a along slotted portion 51a, grasping bracket 19 is restricted in a detaching movement relative to side bracket 17 toward an outside direction of the vehicle body. Further, surface 57a of longitudinal plate 57 of each grasping bracket 19 is contacted with surface 41b of lateral plate 41 of side bracket 17 when grasping brackets 19 are attached to side brackets 17, respectively.

Two grasped holes 65 are formed at upper and lower portions of a backward portion of longitudinal plate 59 of grasping bracket 19. Lower grasped hole 65 is formed into a slot elongated in the vertical direction. In order to grasp cockpit module 1, grasping pins 63, 73 of each installation jig 9 are inserted into grasped holes 65 of each grasping bracket 19 engaged with side bracket 17.

Installation hand 11 shown in FIG. 1 comprises a hand main body 67 extending in the lateral direction, a pair of arm portions 69 forwardly projecting from both end of hand main body 67, and installation jigs 9 provided at the respective tips of arm portions 69.

As shown in FIG. 1, left-hand-side installation jig 9 is movable in the lateral direction by means of an actuator 71 fixed at a tip of left-hand-side arm portion 69 so that grasping pins 63 are able to increasingly and decreasingly change a distance relative to opposite grasping pins 73 of right-hand-side arm portion 69. Right-hand-side installation jig 9 is arranged such that right-hand-side grasping pins 73 are fixed to an installation portion fixed at a tip of right-hand-side arm portion 69.

Subsequently, there will be discussed the manner of operation as to the first embodiment of the installation apparatus for cockpit module 1 in accordance with the present invention.

First, installation operation of grasping bracket 19 to side bracket 17 will be discussed. Connecting pins 49 of each grasping bracket 19 is inserted into connecting holes 51 of side bracket 17 through large diameter holes 51b. Then, grasping bracket 19 is upwardly moved by moving shaft portions 49a along slotted portions 51a. By this upward movement of grasping bracket 19, grasping bracket 19 passes embossed portion 53 of side bracket 17 and thereby being provisionally assembled with side bracket 17 so as not to be detached from side bracket 17.

Next, as shown in FIG. 1, installation hand 11 is moved so that right and left installation jigs 9 are located at outside positions relative to right and left grasping brackets 18 provisionally assembled with side brackets 17. Then, installation hand 11 is horizontally moved toward the left hand side of the vehicle body so that right-hand-side grasping pins 73 are inserted into grasped holes 65 of right-hand-side grasping bracket 19. Thereafter, by driving actuator 71 of left-hand-side installation jig 9, left-hand-side grasping pins 63 are inserted into grasped holes 65 of left-hand-side grasping bracket 19.

After right and left grasping pins 63 and 73 are inserted into grasped holes 65 of both grasping brackets 19, cockpit module 1 is lifted up by upwardly moving installation hand 11. At this moment, grasping brackets 19 generate a force directed toward the upper direction shown by an arrow A in FIG. 3, and cockpit module 1 generates a force directed toward the lower direction shown by an arrow B in FIG. 3. Therefore, connecting pins 49 tend to move in the obliquely upward and frontward direction relative to the vehicle body. As a result, lateral plate 41 of each side brackets 17 and lateral plate 57 of each grasping bracket 17 push with each other as shown by arrows C and D in FIG. 3, and therefore side brackets 17 are strongly engaged with grasping brackets 19, respectively. In addition to this pushing force, a surface 41b of lateral plate 41 of each side bracket 17 is in contact with a surface 57a of lateral plate 57 of each grasping bracket 19. Therefore, side brackets 17 are strongly engaged with grasping brackets 19 both in the longitudinal direction and the lateral direction of the vehicle body.

Under this condition, cockpit module 1 is conveyed into the vehicle body through a front-door opening 77 by manipulating installation hand 11. Then, by moving cockpit module 1 in the forward direction of the vehicle body so that positioning pin 27 of each vehicle-body bracket 21 is inserted into positioning hole 45 of each side bracket 17, cockpit module 1 is provisionally supported by the vehicle body. FIG. 4A shows a positional relationship between positioning pin 27 and positioning hole 45 under a provisional supporting condition. That is, under this condition, positioning hole 45 of side bracket 17 is supported by neck portion 31 of positioning pin 27, and a lower periphery 45a of positioning hole 45 of side bracket 17 is located at a position which is lower than a position of a lower periphery 60a of guide hole 60 of grasping bracket 19 in height level as shown in FIG. 4A. Further, FIG. 5A shows a positional relationship between connecting pin 49 and connecting hole 51 under this provisional supporting condition.

When cockpit module 1 is provisionally installed in the vehicle body as discussed above, as shown in FIG. 6, almost whole part of cockpit module 1 is located outside of front-door opening 77 when they are viewed from a laterally outside direction of front-door opening 77. Located inside of front-door opening 77 are a grasping portion 79 between grasping bracket 19 and installation jig 9 and an inserting portion between grasping pins 63 and 73 and grasping holes 65.

Therefore, even when cockpit module 1 is installed in the vehicle body so that almost all of cockpit module 1 is not exposed within front-door opening 77, it is possible to install cockpit module 1 in the vehicle body by grasping cockpit module 1 by means of grasping pins 63 and 72 of installation jigs 9. This method enables installation jigs 9 to be commonly used with a case that a cockpit module is largely exposed from front-door opening 77. That is, it is not necessary to specifically prepare installation jigs for the case of a cockpit module whose almost all part is not exposed to front-door opening. This utility suppresses the production cost of vehicles.

After cockpit module 1 is provisionally supported by the vehicle body, grasping pins 63 and 73 are removed from grasping holes 65 by outwardly moving left-hand-side grasping pins 63 through the operation of actuator 71 and by moving installation hand 11 toward the backside of a paper in FIG. 6 (corresponding to the right hand side of the vehicle body). Then, installation hand 11 is rearwardly moved until there is no interference between installation jigs 9 and grasping brackets 19. Thereafter, installation hand 11 is moved outside of the vehicle body.

Under this jig removed condition, two bolts 23 are inserted into bolt holes 47 of each side bracket 17 through work holes 61 of each grasping bracket 19, and are tightened with threaded holes 39 of each vehicle-body bracket 21. This tightening operation is executed under the position condition shown by FIGS. 4A and 5A. According to the proceeding of this tightening operation, the upper periphery of positioning hole 45 of each side bracket 17 rides over tapered portion 37 of positioning pin 27, and grasping bracket 19 and side bracket 17 are integrally moved toward vehicle-body bracket 21.

During the process that the upper periphery of positioning hole 45 rides over tapered portion 37 of positioning pin 27, lower periphery 60a of guide hole 60 of grasping bracket 19 is pushed down along the lower portion of tapered portion 37. Finally, as shown in FIG. 4B, positioning hole 45 and guide hole 60 are correctly positioned so as to correspond with large diameter portion 35 of positioning pin 27. FIG. 5B shows a positional relationship between connecting pin 49 and connecting hole 51 under the bolt fully tightened condition.

According to the downward movement of lower periphery 60a of guide hole 60 by the lower portion of tapered portion 37, connecting pins 49 of grasping bracket 19 obliquely and downwardly move along slotted portion 51a of connecting holes 51. Therefore, grasping bracket 19 moves rearward and is released from side bracket 17. Under this provisional-engagement cancelled condition, by moving connecting pins 49 from the position shown by FIG. 5B to the position where large diameter portion 49b of each connecting pin 49 corresponds to large diameter portion 51b of each connecting hole 51 in position and by moving each grasping bracket 19 toward the laterally outside direction of the vehicle body, each grasping bracket 19 is easily detached from each side bracket 17.

Such detached grasping brackets 19 are used for the next installation operation for another cockpit module 1.

Although the first embodiment has been shown and described such that only left-hand-side grasping pins 63 are movable so as to increasingly and decreasingly change the distance relative to right-hand-side grasping pins 73 by driving actuator 71, such an actuator may be installed only in right-hand-side grasping jig 9 for grasping pins 73 or both on right-hand-side and left-hand-side grasping jigs 9. Further, grasping brackets 19 and grasping jigs 9 may be arranged such that grasping holes 65 are formed in grasping jigs 9 and that grasping pins 63 and 73 are provided at grasping brackets 19.

Furthermore, although the first embodiment has been shown and described such that connecting pins 49 are installed in grasping bracket 19 and that connecting holes 51 are formed at side bracket 17, it is of course that connecting pins 49 may be installed in side bracket 17 and that connecting holes 51 may be formed at grasping bracket 19. In such a case, it is necessary to form connecting hole 51 so that large diameter portion 51b is located at an upward and frontward position relative to slotted portion 51a in connecting hole 51.

Figure 7:
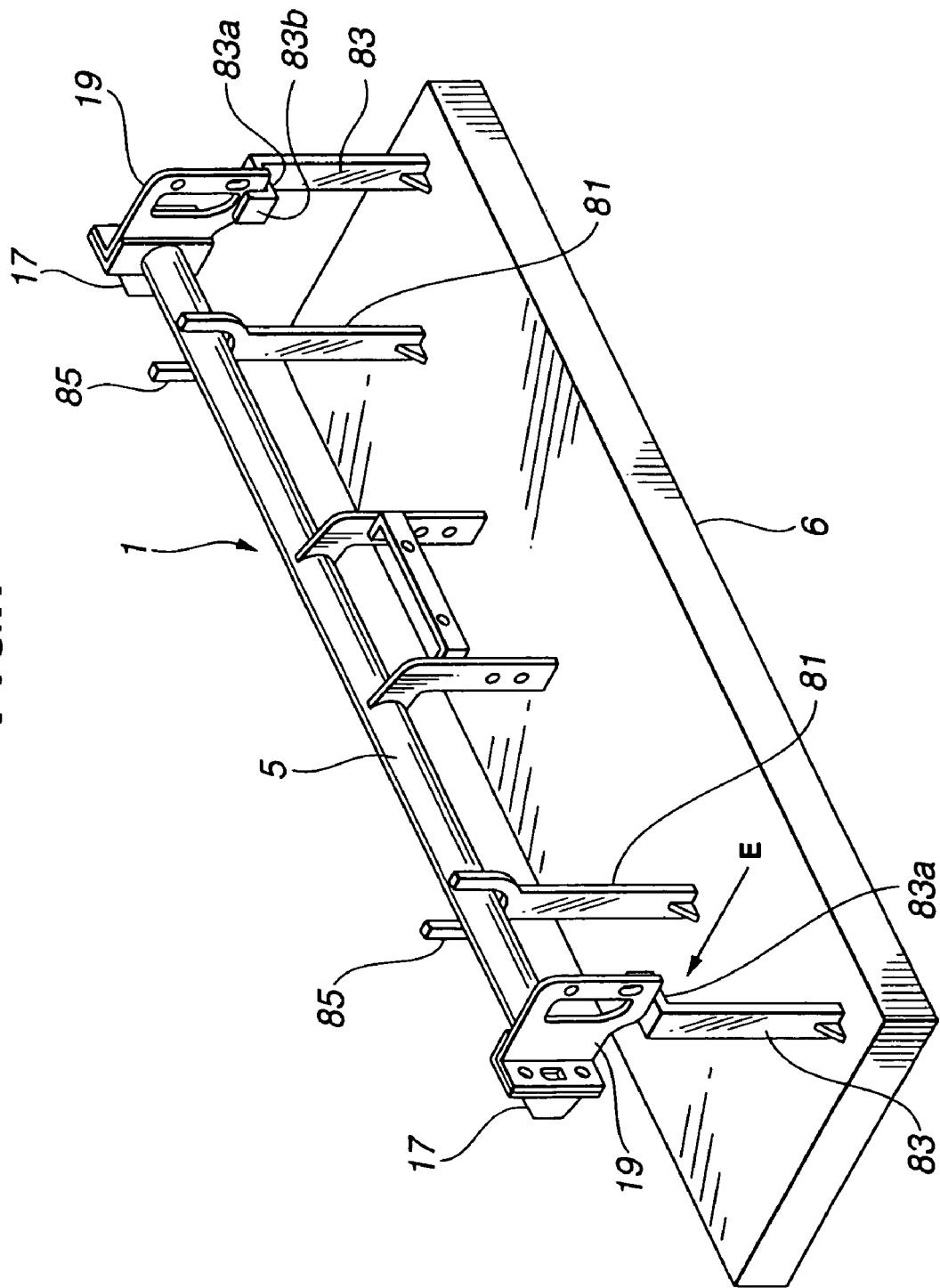
FIG. 7 is a perspective view showing a cockpit module without an instrument panel set on a work mount table.

FIG. 7 shows work mount table 6 on which steering member 5 of cockpit module 1 is mounted although installment panel 3 is facilitated herein. As shown in FIG. 7, work mount table 6 comprises a pair of member supporting posts 81 for supporting steering member 5 and a pair of bracket supporting posts 83 for positioning and supporting grasping brackets 19 which has been already attached to side brackets 17, respectively.

Each member supporting post 81 comprises an upper U-shaped supporting portion 85 which supports steering member 5 and a lower post portion which stands on work mount table 6 and is integral with U-shaped supporting portion 85.

Figure 8:
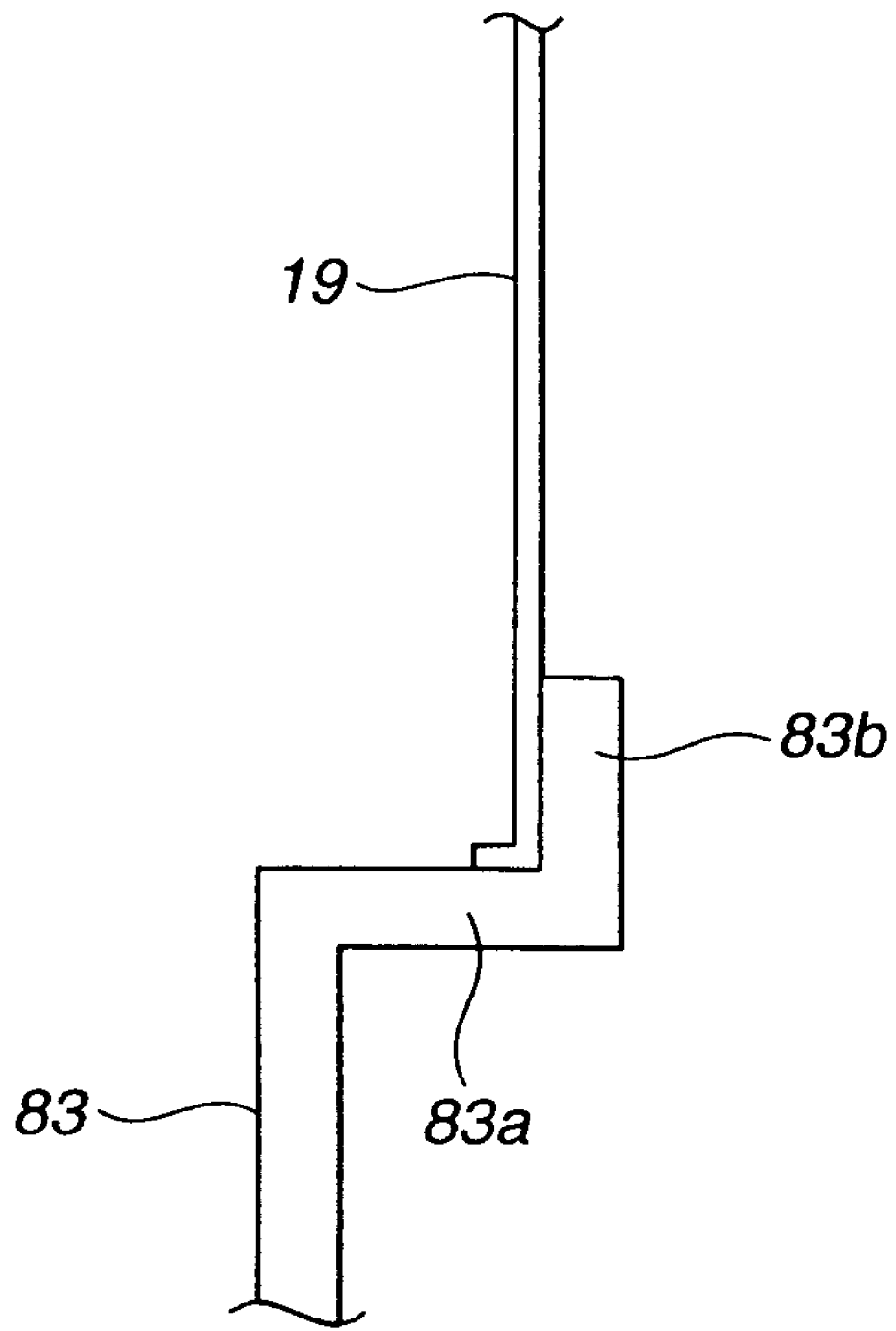
FIG. 8 is an enlarged partial view as viewed from a direction of an arrow E in FIG. 7.

Each bracket supporting post 83 comprises a horizontal portion 83a which horizontally extends toward a laterally center position and a vertical portion 83b which vertically extends from an inner end of horizontal portion 83a in the upward direction, as shown in FIG. 8 which shows an enlarged view as viewed from a direction of an arrow E in FIG. 7.

Since a lower end of grasping bracket 19 is installed at horizontal portion 83a and is positioned thereby, a rotation of cockpit module 1 around a longitudinally axial center of cockpit module 1 is restricted. Therefore, an inserting operation of grasping pins 63 and 73 into grasping holes 65 is easily and certainly executed. This improves the workability as to the installation of cockpit module 1.

Figure 9:
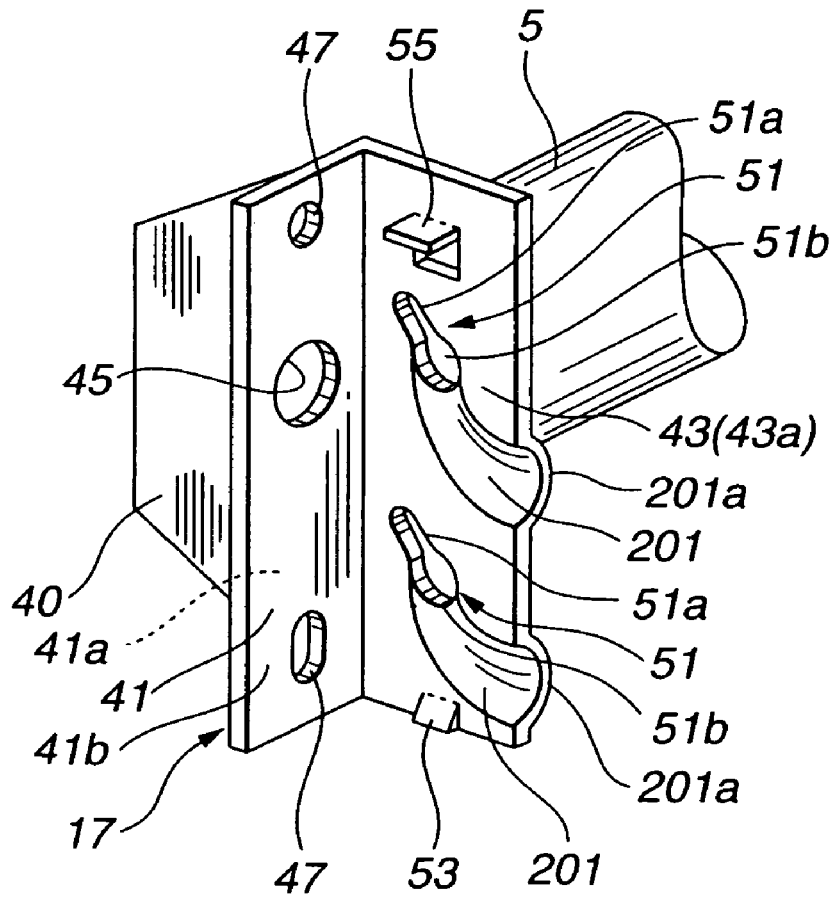
FIG. 9 is a perspective view showing a modification of the side bracket shown in FIG. 2.

FIG. 9 shows a modification of side bracket 17. This modified side bracket 17 has two recess portions 201 which guide connecting pins 49 of each grasping bracket 19 into connecting holes 51, respectively. The other construction of this modified side bracket 17 is the same as that shown in FIG. 2, and therefore the same parts are denoted by the same reference numerals of FIG. 2.

Each recess portions 201 is formed at an areas from an end portion 201a located at a lower and rearward position relative to connecting hole 51 toward large diameter hole 51b. A vertical width of each recess portion 201 gradually decreases from end portion 201a toward large diameter hole 51b. In the vicinity of large diameter hole 51b, the vertical width of recess portion 201 is generally the same as the diameter of large diameter hole 51b. As is clearly shown FIG. 9, recess portion 201 is upwardly curved toward connecting hole 51.

Figure 10:
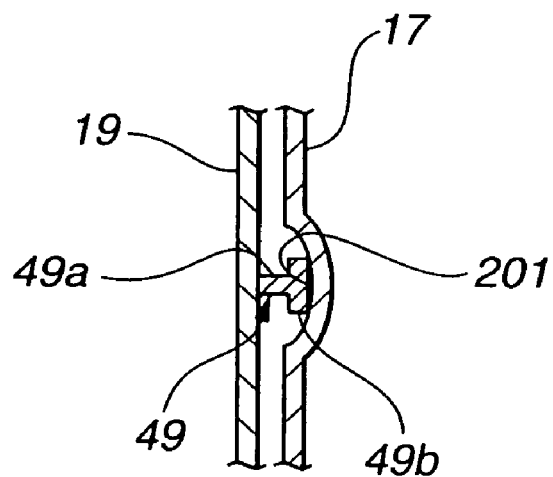
FIG. 10 is an explanatory view showing an operation of the modification of FIG. 9.

When grasping bracket 19 is attached to side bracket 17 which has the above-discussed recess portions 201, connecting pins 49 of grasping bracket 19 are roughly placed in the vicinity of end portions 201a of recess portions 201. Then, large diameter portions 49b of connecting pins 49 are pressed against recess portions 201 as shown in FIG. 10, and are moved along recess portions 201. Thereafter, when connecting pins 49 reach connecting holes 51, connecting pins 49 are inserted into large diameter portions 51b of connecting holes 51. Then, grasping bracket 19 is upwardly and obliquely moved to install grasping bracket 19 on side bracket 17.

With this modified arrangement, by roughly placing connecting pins 49 in the vicinity of end portions 201a of recess portions 201, it becomes possible that large diameter portions 49b of connecting pins 49 are moved along the shapes of recess portions 201 to connecting holes 51. Therefore, this modified arrangement of side brackets 17 enables two connecting pins 49 to be quickly and easily connected with corresponding connecting holes 51. Further, this arrangement shortens a time period for learning the operation for this attaching operation and improves the workability while side brackets 17 maintain rigidity with no extra parts.

Figure 11:
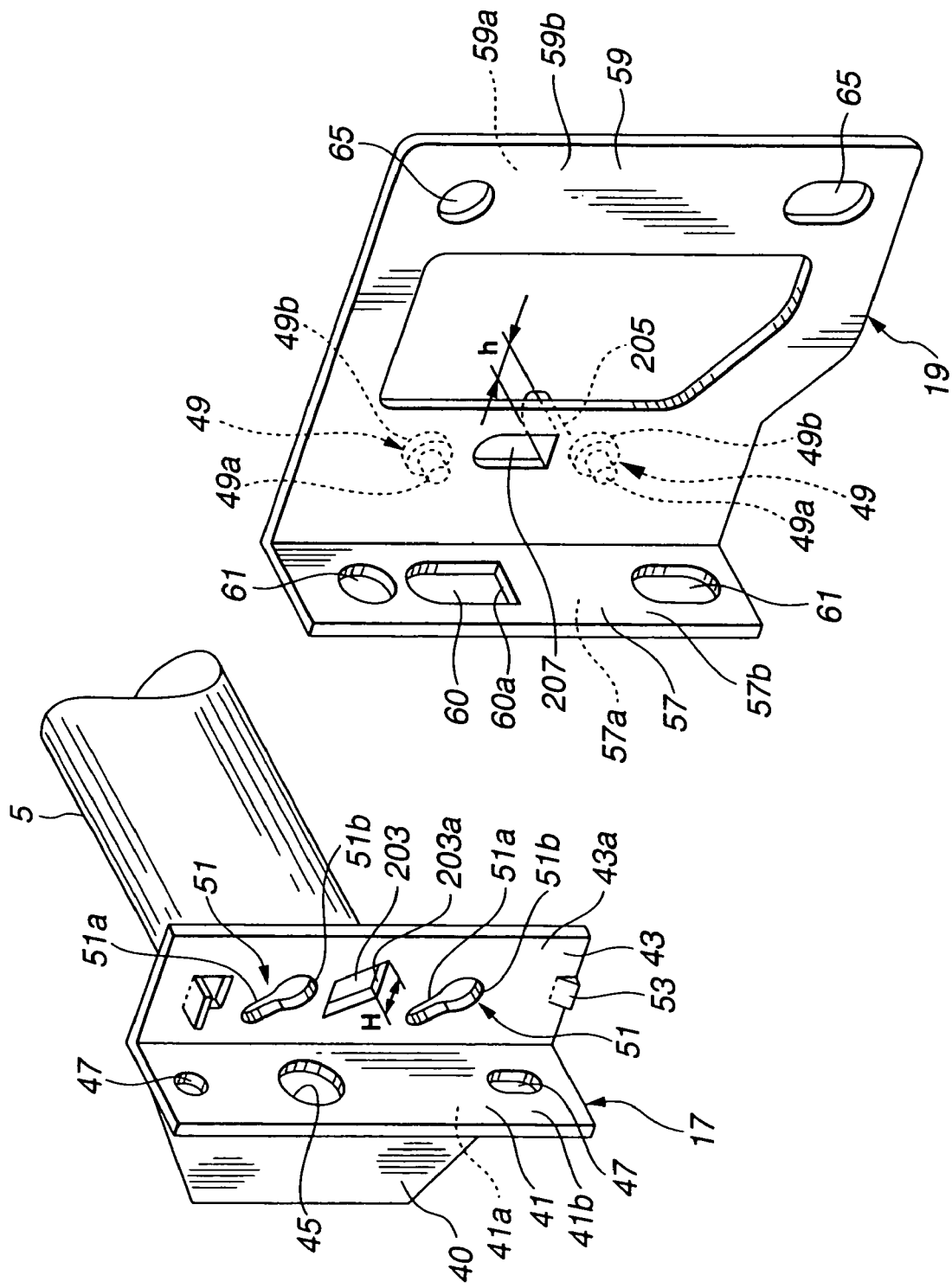
FIG. 11 is a perspective view showing another modification of the side bracket and the grasping bracket.

FIG. 11 shows another modification of side bracket 17 and a modified grasping bracket 19 corresponding to the modified side bracket 17. As is clearly shown in FIG. 11, this modified side bracket 17 has a rhombic guide hole 203 between connecting holes 51. A lower periphery 203a of rhombic guide hole 203 is generally parallel with upper and lower sides of side bracket 17. That is, lower periphery 203a is generally horizontal when cockpit module 1 is installed in the vehicle body or set on work mount table 6.

Grasping bracket 19 of this modification has a projection 205 between connecting pins 49. This projection 205 is formed by deforming a part of longitudinal plate 59 toward the center portion of the vehicle body. More specifically, this projection 205 has a circular tip and is bent perpendicular to longitudinal plate 59 (horizontally). Further, a length of projection 205 is greater than that of connecting pin 49.

The size of rhombic guide hole 203 is sufficiently greater than projection 205. Therefore, when circular tip of projection 205 is set on lower periphery 203a of rhombic guide hole 203, two connecting pins 49 are fitted with large diameter portions 51b of connecting holes 51. Herein, a dimension H of lower periphery 203a of guide hole 203 is set to be generally the same as a width h of projection 205.

When grasping bracket 19 is attached to side bracket 17 with such rhombic guide hole 203, the circular tip of projection 205 of grasping bracket 19 is first inserted into guide hole 203 of side bracket 17 by roughly bring connecting pins 49 nearer to connecting holes 51. During this operation, connecting pins 49 are located in position so as not to reach guide hole 203.

Figure 12A:
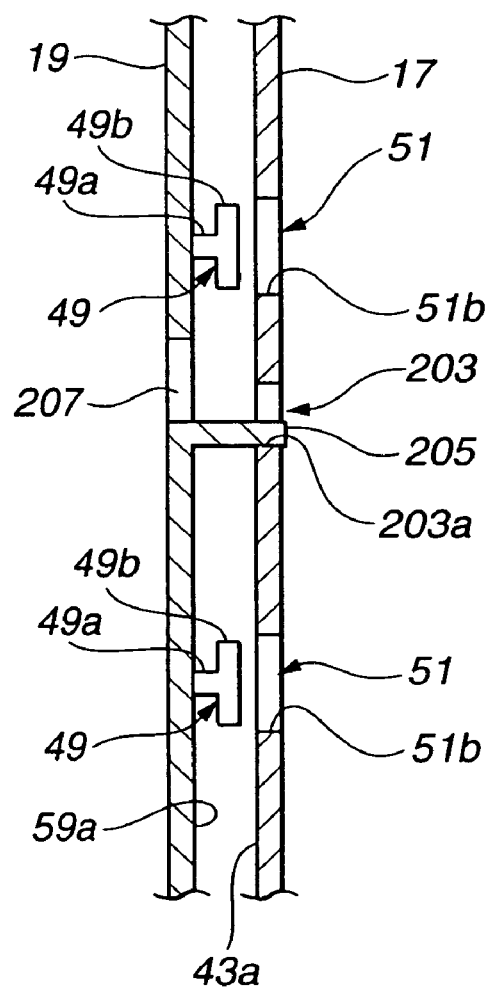
FIG. 12A is a cross sectional view showing the modification of FIG. 11 set in a state that a projection is in contact with a lower periphery of a guide hole.
Figure 12B:
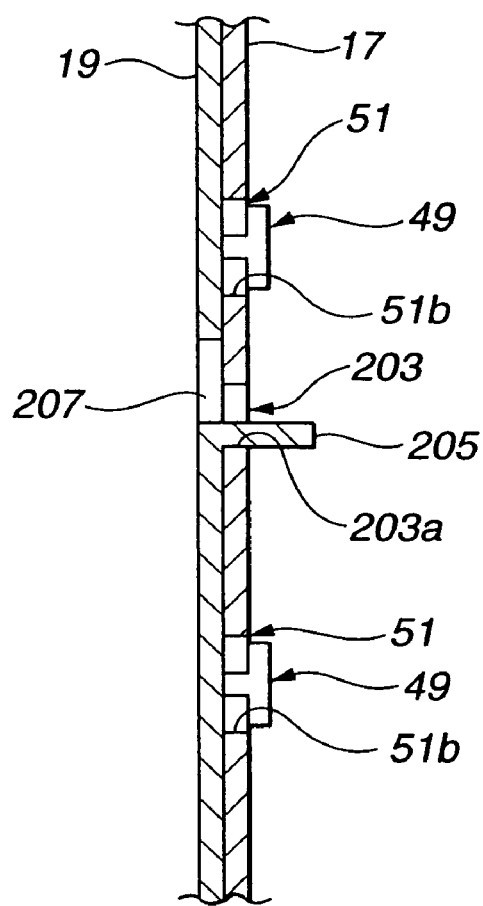
FIG. 12B is a cross section view showing the modification of FIG. 11 set in a state that the connecting pin is inserted into a connecting hole.

Next, by positioning projection 205 on lower periphery 203a of guide hole 203 as shown in FIGS. 12A and 13A, connecting pins 49 correspond with large diameter holes 51b of connecting holes 51 in position. Under this condition, by moving grasping bracket in the right hand side direction in FIG. 12A, and then by obliquely and upwardly moving grasping bracket 19 as is similar to the operation in FIG. 2, grasping bracket 19 is installed on side bracket 17. By the oblique and upward movement of grasping bracket 19, connecting pins 49 move in slotted portions 51a of connecting holes 51, and projection 205 moves in guide hole 203 as shown in FIG. 13B.

With this installation operation of the modified grasping bracket 19 with side bracket 17, by roughly bringing grasping bracket 19 nearer to side bracket 19 and by contacting projection 205 with lower periphery 203a of guide hole 51, connecting pins 49 are correctly placed relative to corresponding connecting holes 51. Therefore, it becomes possible to quickly and easily connect two connecting pins 49 with corresponding connecting holes 51. Further, this modified arrangement shortens a time period for learning the operation for this attaching operation and improves the workability of this installation process.

Further, when an operator inserts projection 205 into guide hole 203, the operator can recognize side bracket 17 through a hole 207 for projection 205. This further facilitates this inserting operation of projection 205 into guide hole 203.

Further, with this modified arrangement of side bracket 17 and grasping bracket 19, the detaching operation of grasping bracket 19 is also facilitated. That is, by drawing connecting pins 49 from connecting holes 51 under a condition that projection 205 is in contact with lower periphery 203a of guide hole 203, large diameter portions 49b of connecting pins 49 pass through large diameter holes 51b of connecting holes 51. Therefore, connecting pins 49 are easily released from connecting holes 51.

That is, these improvements are achieved by providing guide hole 203 in side bracket 17 and by integrally forming projection 205 on grasping bracket 19 without increasing the number of parts and the weight of the apparatus.

Further, grasping bracket 19 and side bracket 17 may be modified such that projection 205 is formed on side bracket 17 so as to project toward the outside direction of the vehicle body and that guide hole 203 is formed on grasping bracket 19 so as to engage with projection 205. In such a case, it is necessary that connecting pins 49 are correctly placed relative to large diameter holes 51b of connecting holes 51 when projection 205 of side bracket 17 is contacted with an upper periphery of guide hole 203 of grasping bracket 19.

Figure 3:
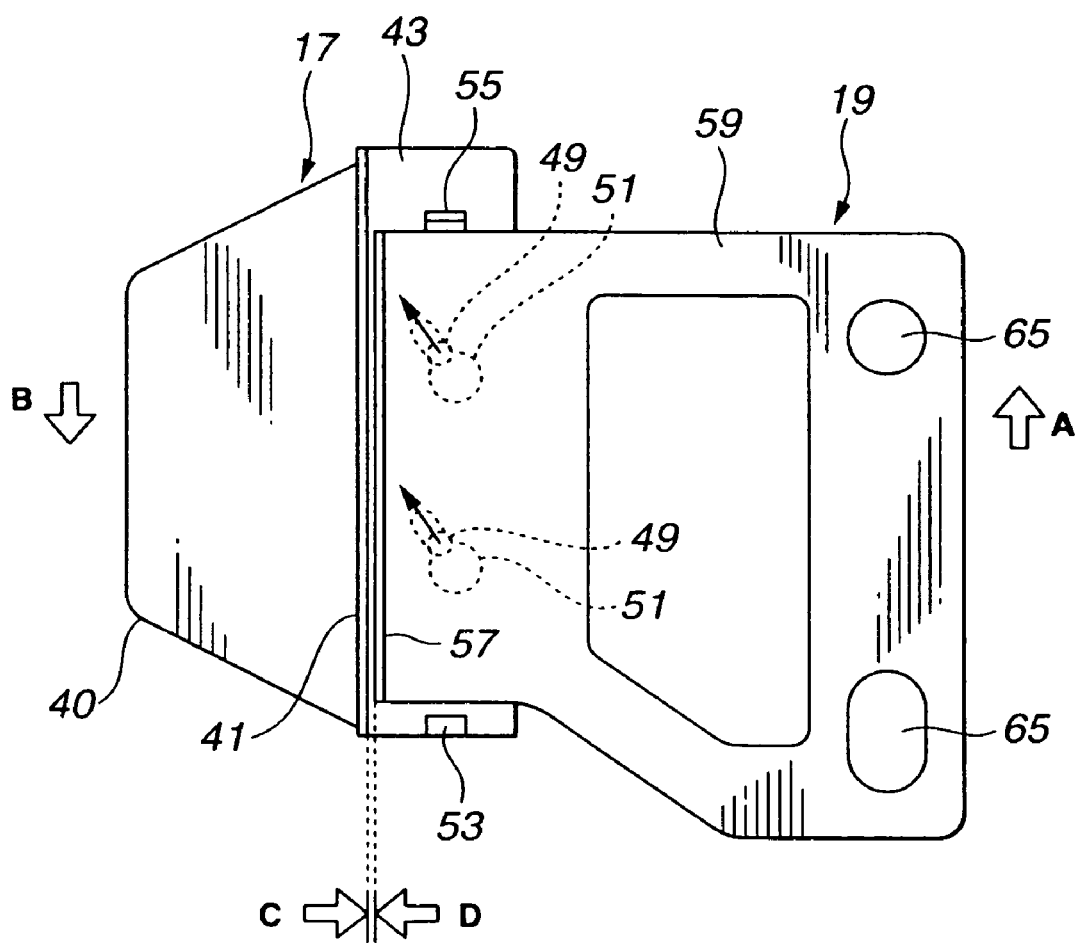
FIG. 3 is an explanatory view showing an operation of a grasping bracket of the installation apparatus.

FIG. 14 shows a modification of the first embodiment wherein there are provided a drop restricting portion for preventing grasping bracket 18 from dropping from side bracket 18 and a drop-restriction canceling portion for canceling drop restriction of grasping bracket 19, instead of embossed portion 53 shown in FIGS. 2 and 3.

More specifically, a rectangular restriction hole 209 is provided between positioning hole 45 and lower bolt hole 47 of lateral plate 41 of side bracket 17. Further, a restriction projection 211 is provided between guide hole 60 and work lower work hole 61 of lateral plate 57 of grasping bracket 19 so as to be inserted into restriction hole 209 of lateral plate 41 of side bracket 17. Restrict projection 211 is formed by raising it from lateral plate 61 of grasping bracket 19 toward side bracket 17. Restriction hole 209 and restriction projection 211 constitute the drop restriction portion.

Further, a press projection 213 functioning as a restriction canceling portion is provided between guide pin 29 and lower threaded hole 39 of vehicle-body bracket 21. Press projection 213 projects from fixing surface 25 of vehicle-body bracket 21 toward restriction hole 209 of side bracket 17. Press projection 213 is formed by embossing fixing surface 25, and a projection quantity of press projection 213 is greater than a thickness of lateral plate 41 of side bracket 17.

When grasping bracket 19 is attached to side bracket 17 in case of this modification having the drop restriction portion and the restriction canceling portion, by inserting connecting pins 49 of each grasping bracket 19 into connecting holes 51 of each side bracket 17 and by upwardly and obliquely moving connecting pins 49 in connecting holes 51, restriction projection 211 is inserted into restriction hole 209, and a lower end of restriction projection 211 rides on a lower periphery of restriction hole 209 as shown in FIG. 15A. Under this riding-on condition, a clearance is formed between lateral plate 57 of grasping bracket 19 and lateral plate 41 of side bracket 17, as is similar to that of FIG. 3.

By this riding-on of the lower end of restriction projection 211 on the lower periphery of restriction hole 209, the drop of grasping bracket 19 from side bracket 19 is further certainly prevented as compared with the case of embossed portion 53 shown in FIGS. 2 and 3. Therefore, even when grasping pins 63 and 73 of installation hand 11 are detached from grasping holes 65 of grasping brackets 18, a dropping of grasping brackets 19 from side bracket 17 is certainly prevented, and the workability of this operation is further improved.

After grasping bracket 19 is attached to side bracket 17, positioning pins 27 of vehicle-body brackets 21 are inserted into positioning holes 45 of side brackets 17 to temporally support cockpit module 1 by moving cockpit module 1 grasped by installation hand 11 into the vehicle body, as is similar to the operation shown in FIG. 4A, and as shown in FIG. 15B. Thereafter, installation hand 11 is released from cockpit module 1 and is moved outside of the vehicle body.

Under the provisional installation state shown in FIG. 15B, grasping bracket 19 is moved forward of the vehicle body as compared with the state shown FIG. 15A. Accordingly, lateral plate 57 of grasping bracket 19 is contacted with lateral plate 41 of side bracket 17, and a predetermined distance T is formed between the lower end of restriction projection 211 and the lower periphery of restriction hole 209.

Next, as is similar to the operation shown in FIG. 2, two bolts 23 are screwed with threaded holes 39 of each vehicle-body bracket 21 through work holes 61 and bolt holes 47 to secure side bracket 17 with vehicle-body bracket 21. During this operation, grasping bracket 19 integrally moves together with side bracket 17 while the upper periphery of positioning hole 45 of each side bracket 17 rides over the upper portion of tapered portion 37 of positioning pin 27. In synchronization with the movement of grasping bracket 19, a tip of press projection 213 of vehicle-body bracket 21 presses a portion near the lower end of restriction projection 211 to cancel the engagement of restriction projection 211 with restriction hole 209, as shown in FIG. 15C. With this arrangement of press projection 213, the detachment of grasping brackets 19 from side brackets 17 are easily executed, and thereby improving the installation reliability and the detachment reliability of grasping brackets 19.

Under the provisional installation state shown in FIG. 15B, a relationship between distance T and an upward projection quantity S is set such that T>S, wherein T is a distance between the lower end of restriction projection 211 and the lower periphery of the restriction hole 209, and S is the upward projecting quantity of the lower periphery of guide hole 60 of grasping bracket 19 relative to lower periphery 45a of positioning hole 45 of side bracket 17.

With this dimensional setting between distance T and upward projection quantity S, it becomes possible to detach the lower periphery 60a of guide hole 60 of grasping bracket 19 from side bracket 17 along tapered portion 37 of positioning pin 27 without generating an interference between the lower end of restriction projection 211 and the lower periphery of restriction hole 209. Accordingly, this modified grasping bracket 17 maintains a detaching function.

Further, the drop restriction and the drop-restriction cancellation of grasping bracket 19 are achieved by providing restriction hole 209 at side bracket 17, restriction projection 211 at grasping bracket 19 and press projection 213 at vehicle-body bracket 21. Accordingly, this arrangement is achieved without employing new parts and improves the installation reliability and the detachment reliability of grasping brackets 19.

Figure 16:
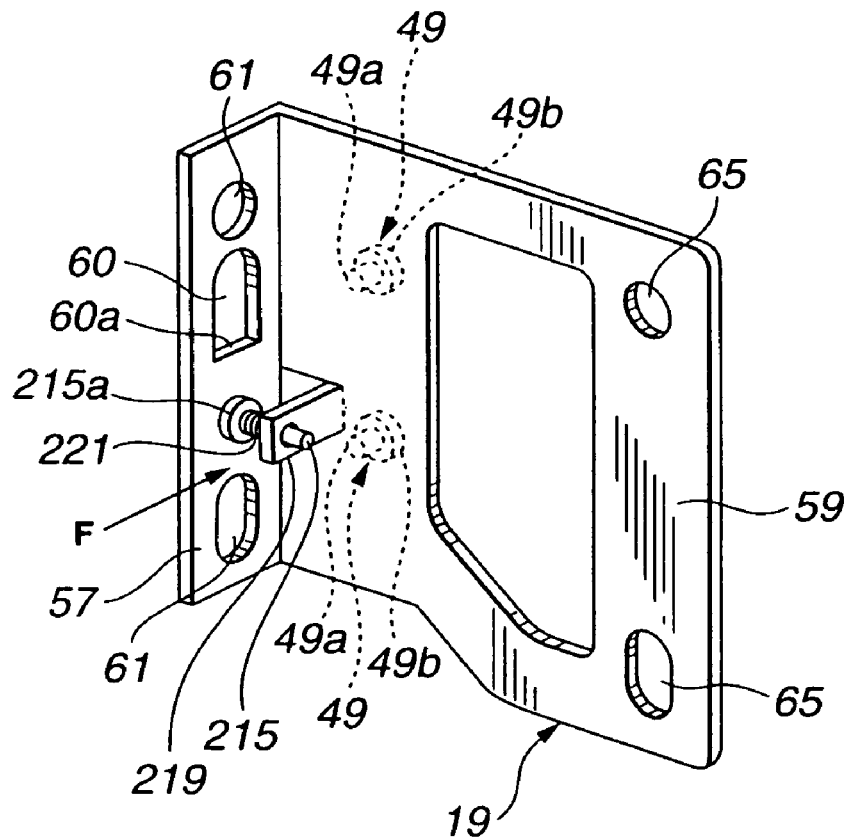
FIG. 16 is a perspective view showing a modification of FIG. 14.
Figure 17:
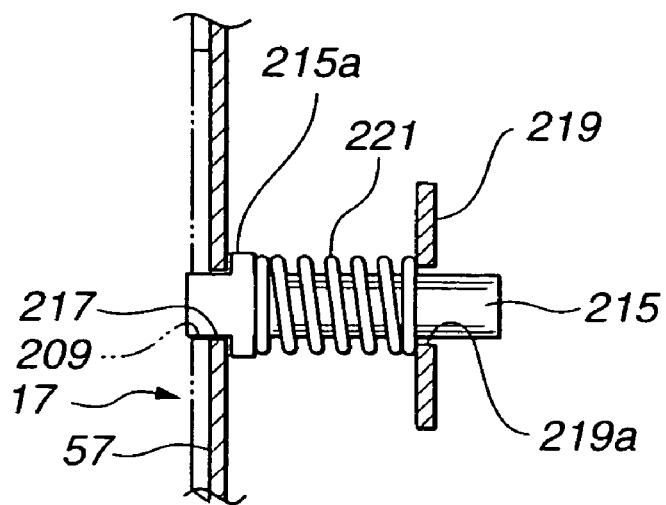
FIG. 17 is a sectional view taken in a direction of an arrow F of FIG. 16.

FIG. 16 shows another modification which employs a restriction pin 215 instead of restriction projection 211 of grasping bracket 19 of FIG. 14. Both ends of restriction pin 215 are inserted respectively into a through-hole 217 formed at lateral plate 57 of grasping bracket 19 and a through-hole 219a formed on a projection part 219 raised longitudinal plate 59 so as to be slidingly movable relative to grasping bracket 19, as shown in FIG. 17 which is a cross sectional view taken in the direction of an arrow F in FIG. 16.

Restriction pin 215 has a flange 215a which is formed in the vicinity of through hole 217 and between lateral plate 57 and projection part 219. Further, a spring 221 is provided between flange 215a and projection part 219 as a spring means for pressing restriction pin 215 toward lateral plate 57 of side bracket 17, that is, toward the left hand side in FIG. 17.

When grasping bracket 19 is attached to side bracket 17 in case of this modification shown in FIG. 16, by inserting connecting pins 49 of each grasping bracket 19 into connecting holes 51 of each side bracket 17 and by upwardly and obliquely moving connecting pins 49 in connecting holes 51 as is similar to the operation shown in FIG. 3, a projecting portion of restriction pin 215, which projects from lateral plate 51 toward side bracket 17, is inserted into restriction hole 209, and a lower end of restriction projection 211 rides on a lower periphery of restriction hole 209 as is similar to a condition shown in FIG. 15A. With this modified arrangement shown in FIG. 16, it is possible to certainly restrict and prevent grasping bracket 19 from dropping from side bracket 17.

Further, when grasping bracket 19 is detached from side bracket 17, a tip end of press projection 213 of vehicle-body bracket 21 presses the projecting portion of restriction pin 215 against the biasing force of spring 221 and thereby canceling the connection of restriction pin 215 with restriction hole 209. In this case, press projection 213 is formed into a shape which is able to be inserted into through-hole 218 to enable the pressing operation to restriction pin 215. With this arrangement, it becomes possible to easily detach grasping bracket 19 from side bracket 17 and thereby improving the installation reliability and the detachment workability. Further, since this modification is arranged such that restriction pin 215 is moved relative to grasping bracket 19 during the detaching operation (canceling operation), the drop restricting and drop-restriction canceling mechanism of this modified arrangement ensures a high durability against repeated operations.

Figure 18:
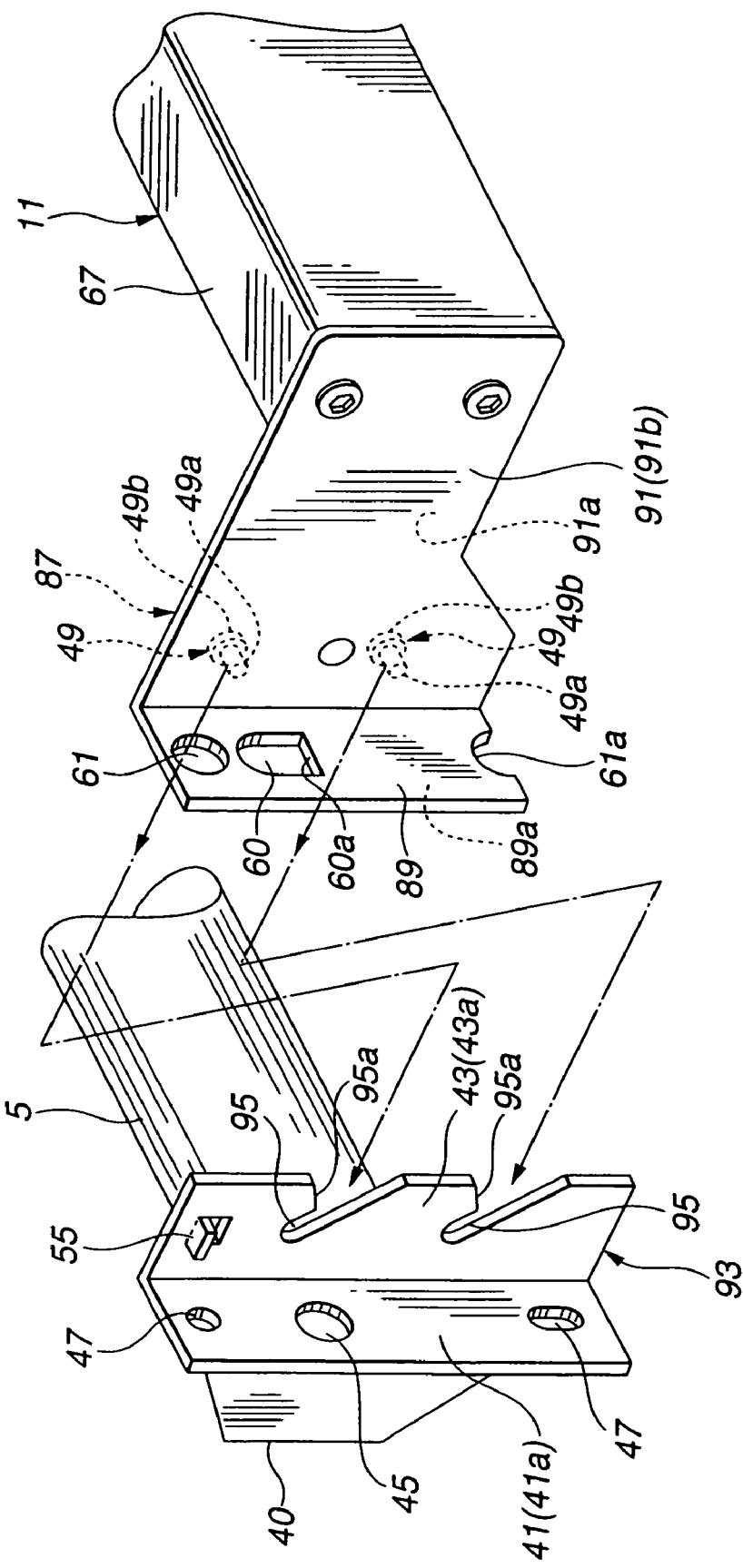
FIG. 18 is a perspective view showing a second embodiment of the installation apparatus according to the present invention.

FIG. 18 shows a second embodiment of the installation apparatus for installing cockpit module 1 in the vehicle body in accordance with the present invention.

The second embodiment employs no grasping brackets 19, and employs a pair of attachments 87 fixed at both end portions of hand body 67 of installation hand 11, respectively. Each attachment 87 comprises a lateral plate 89 and a longitudinal plate 91 which are integral and formed into an L-shaped cross-section. Lateral plate 89 has guide hole 60, one work hole 61 and one work cutout 61a, as shown in FIG. 18. Longitudinal plate 91 has the pair of connecting pins 49 which projects toward the inside of the vehicle body as are similar to those of grasping bracket 19 of the first embodiment.

A pair of side brackets 93 are installed at both ends of steering member 5. Each side bracket 93 comprises a lateral plate 41 and a longitudinal plate 43 as is similar to those of side bracket 17 of the first embodiment. Positioning hole 45 and bolt holes 47 are formed on lateral plate 41 as are similar to those of side bracket 17 of the first embodiment. A pair of connecting grooves 95 are formed at rear end portions of each side bracket 93 instead of connecting holes 51 of the first embodiment.

Each connecting groove 93 is formed into a slot which inclines forwardly and upwardly, and an opening end of connecting groove 93 is formed into a wide cutout 95a. A projection 55 is formed at an upper portion of longitudinal plate 43 by raising a part of longitudinal plate 43 outwardly.

When this arrangement of the second embodiment shown in FIG. 18 is employed in the installation operation of cockpit module 1 into the vehicle body, cockpit module 1 is grasped by installation hand 11 by moving connecting pins 49 of attachment 87 toward connecting grooves 95 of side bracket 93 so as to connect connecting pins 49 and connecting grooves 95 respectively. Keeping this state, cockpit module 1 is conveyed in the vehicle body through the front-door opening 77 by manipulating installation hand 11, as is similar to the operation of the first embodiment. Further, side brackets 93 are provisionally supported by positioning pins 27 of vehicle-body brackets 21 as similar to the operation shown in FIG. 4A.

The tightening operation of bolts 23 for securing side brackets 93 with vehicle-body brackets 21 are basically the same as the operation of the first embodiment except that attachments 87 are employed instead of grasping brackets of the first embodiment.

When the provisional supporting condition of this second embodiment is in a state as same as that shown in FIG. 4B, the engagement function of attachments 87 with side brackets 93 is cancelled. Then, attachments 87 are released from side brackets 93 by rearwardly and downwardly moving installation hand 11. Thereafter, installation hand 11 is moved outside of the vehicle body to execute the next installation operation of another cockpit module 1 to another vehicle body.

Although almost whole part of cockpit module 1 of this second embodiment is also located outside of front-door opening 77 as viewed from a laterally outside of front-door opening 77 in FIG. 6, it is possible to easily grasp cockpit module 1 by moving attachments 87 in the longitudinal direction of the vehicle body.

Since attachments 87 are secured to installation hand 11, it becomes possible to eliminate the attaching and detaching operations of grasping brackets 19. This further improves the workability of the installation operation. Further, since it is possible to eliminate the slide mechanism for grasping pins 63 of installation hand 11, the cost reduction is also achieved thereby.

Although the second embodiment has been shown and described such that connecting pins 49 are provided at each attachment 97 and that connecting grooves 95 are provided at each side bracket 93, it is of course that connecting pins 49 are provided at each side bracket 93 and that connecting grooves 95 are provided at each attachment 97.

Referring to FIGS. 19 to 24, there is shown a third embodiment of the installation apparatus according to the present invention. In this third embodiment, same elements as same as those of the first embodiment are denoted by the same reference numerals of the first embodiment, and the explanations thereof are omitted herein.

Figure 20:
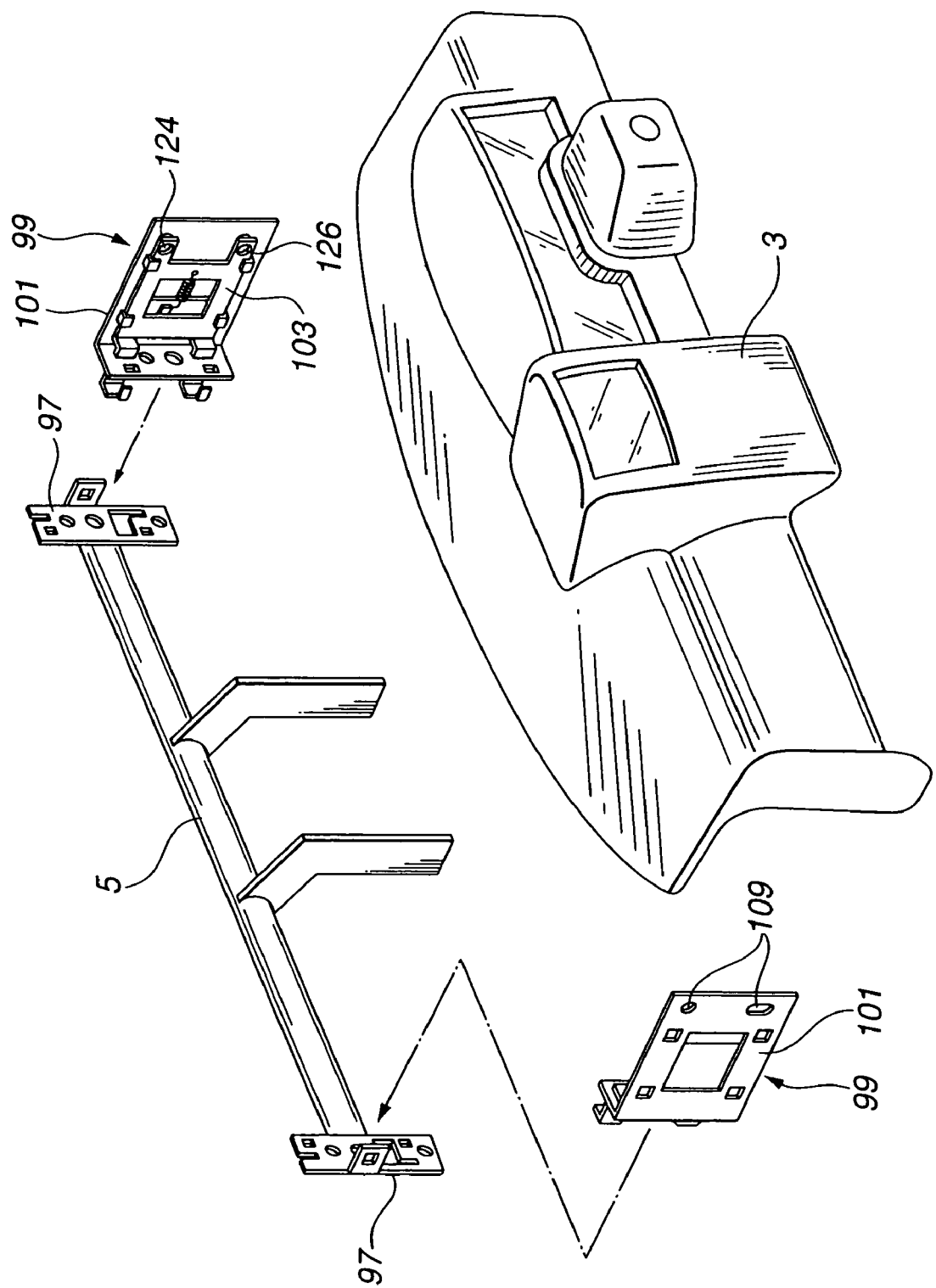
FIG. 20 is an exploded perspective view of the grasping structure of FIG. 19.

As shown in FIG. 20, the third embodiment employs side brackets 97 and grasping brackets 99 which are different from those of the first embodiment. Therefore, there will be particularly explained side bracket 97 and grasping bracket 99 with reference to FIG. 21 which shows them located at the left hand side of installation hand 11. Since side brackets 97 and grasping brackets 99 are both mirror symmetry, only the explanation for brackets 97 and 99 of the left-hand-side will be discussed hereinafter.

Figure 21:
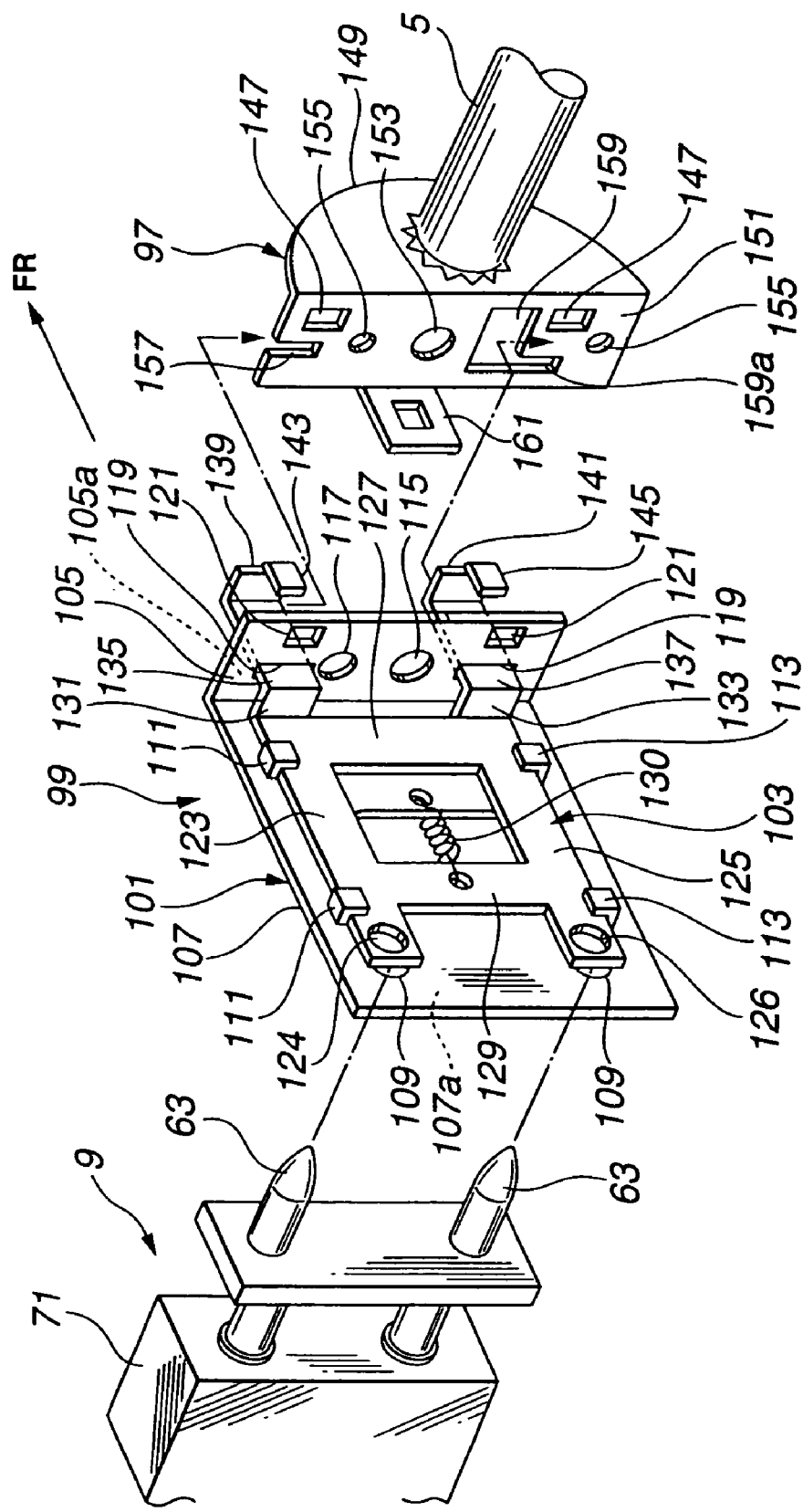
FIG. 21 is an exploded perspective view showing an essential part of the installation apparatus of FIG. 19.

Grasping bracket 99 comprises a bracket body 101 and an inner bracket 103 which is disposed inside of bracket body 101 and is movable in the longitudinal direction of the vehicle body. In FIG. 21, an arrow FR shows a frontward direction of the vehicle body.

Bracket body 101 has a lateral contact plate 105 extending in the lateral direction of the vehicle body and a side plate 107 extending in the longitudinal direction of the vehicle body. Lateral contact plate 105 and side plate are connected with each other to form an L-shaped cross section.

Two grasping holes 109 are formed at upper and lower positions of the rearward portion of side plate 107 so that grasping pins 63 of grasping jigs 9 are inserted into grasping holes 109 to grasp cockpit module 1. A pair of upper guide hooks 111 and a pair of lower guide hooks 113 are formed in the vicinities of upper and lower peripheries of side plate 107, respectively, so as to guide the longitudinal slide movement of inner bracket 103.

Lateral contact plate 105 has a positioning hole 115 into which a positioning pin (not shown) of vehicle-body bracket is inserted, a work hole 117 through which a bolt for securing steering member 5 with the vehicle-body bracket, two through-holes 119 into which two parts of inner bracket 102 are inserted, and two fixing holes 121 into which fixing ends of inner bracket 103 are inserted. A diameter of work hole 117 is greater than a diameter of a head portion of the bolt for securing cockpit module 1.

Inner bracket 103 has an upper member 123 guided by upper guide hooks 111 and a lower member 125 guided by lower guide hooks 113. Upper and lower members 123 and 125 are connected by front and rear connecting members 127 and 129. A front portion of bracket body 101 and rear connecting member 129 of inner bracket 103 are connected by a coil spring 130 so that inner bracket 103 is biased in the forward direction relative to bracket body 101. Upper and lower guide holes 124 and 126 are formed at a rear end portion of upper member 123 and a rear end portion of lower member 125, respectively.

When inner bracket 103 is biased toward a frontward of the vehicle body relative to bracket body 101 due to a biasing force of coil spring 130, center axes of guide holes 124 and 126 are offset from center axes of grasping holes 109 of bracket body 101 toward the frontward direction of the vehicle body while a part of each guide hole 124, 126 is overlapped with a part of each grasping hole 109. Upper and lower guide holes 124 and 126 have a diameter as same as that of grasping holes 109 of bracket body 101, and the diameter thereof is slightly greater than a diameter of grasping pin 63.

Upper member 123 has a first bent portion 131, a second bent portion 135, a third bent portion 139 and a connecting hook 143 as shown in FIG. 21. Similarly, lower member 125 has a first bent portion 133, a second bent portion 137, a third bent portion 141 and a connecting hook 145 as shown in FIG. 21. First bent portions 131 and 133 are bent from a front end portions of upper and lower members 123 and 125 toward the inward direction of the vehicle body, respectively. Second bent portions 135 and 137 are bent from first bent portions 131 and 133 toward the frontward direction of the vehicle body, respectively. Third bent portions 139 and 141 functioning as pressing means are bent from second bent portions 135 and 137 toward the inward direction of the vehicle body, respectively.

Connection hooks 143 and 145 extend from lower portions of third bent portions 139 and 141 toward the rearward direction of the vehicle body, respectively. Second bent portions 135 and 137 are movably inserted into through-holes 119 of contacting plate 105 of bracket body 101. Connection hook 143 of upper member 123 is inserted into upper connecting hole 121 of contacting plate 105 and an upper connecting hole 147 of side bracket 97, and connection hook 145 of lower member 125 is inserted into lower connecting hole 123 of contacting plate 105 and a lower connecting hole 149 of side bracket 97.

Side bracket 97 has a connecting portion 149 integrally connected with each shaft end of steering member 5 and a lateral installation portion 151 integrally connected at a rear periphery of connecting portion 149. Lateral installation portion 151 is in contact with a surface 105a of lateral contact plate 105 when grasping bracket 99 is attached to side bracket 97.

Lateral installation portion 151 has a positioning hole 153 into which the positioning pin of the vehicle-body bracket is inserted, upper and lower bolt holes 155 for securing steering member 5 to the vehicle-body bracket, a cutout into which upper one of second bent portion 135 is inserted from the upper side, an insertion through-hole 159 into which lower one of third bent portion 141 of inner bracket 103 is inserted from the rear side, and two connecting holes 147 which are connected with connecting hooks 143 and 145, respectively.

Under a condition that third bent portion 141 is inserted into insertion through-hole 159, upper second bent portion 135 is located above lateral installation portion 151. From this condition, grasping bracket 99 is moved downwardly to insert upper second bent portion 135 into cutout 157. Therefore, insertion through-hole 159 has a cutout 159 into which lower second bent portion 137 is inserted.

Figure 22:
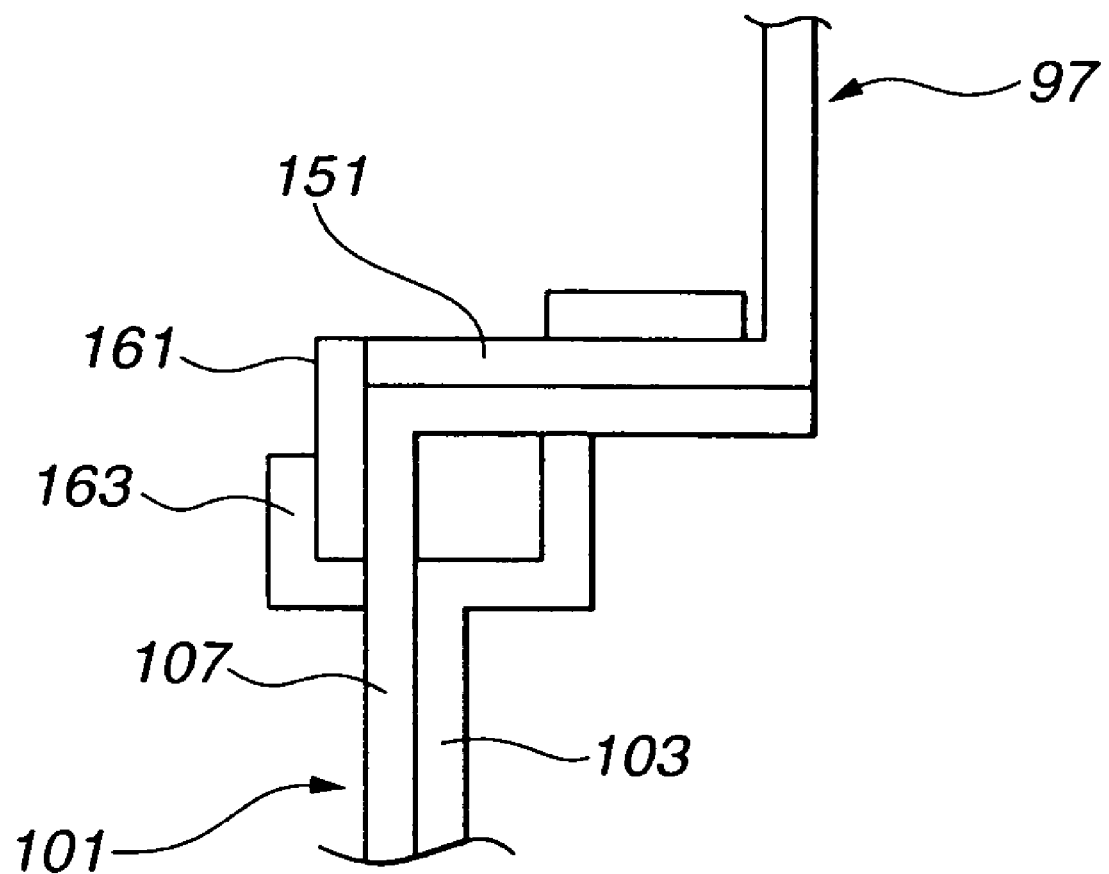
FIG. 22 is a plan view showing a connecting state between a receiving hook of the side bracket and the grasping bracket.

Further, a flange portion 161 extends from an outer periphery of lateral installation portion 151 in the rearward direction. A receiving hook 163 is formed on an outer surface 107a of longitudinal plate 107 of bracket body 101. Accordingly, as shown in FIG. 22, when grasping bracket 99 is attached to side bracket 99, receiving hook 163 receives flange portion 161 integral with installation portion of side bracket 97.

Figure 23A:
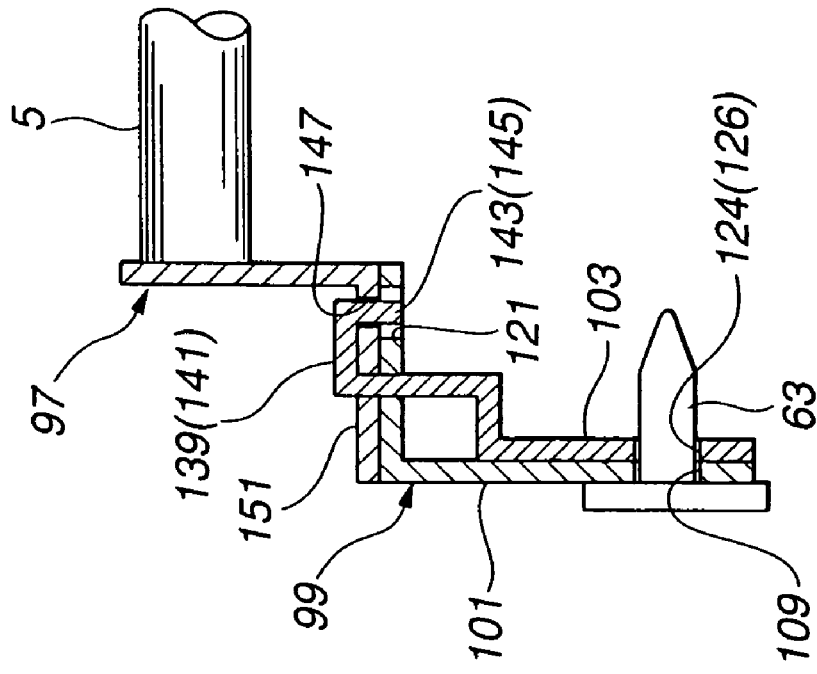
FIG. 23A is a cross sectional view showing a provisional supporting state of the grasping bracket with the side bracket.

Next, the manner of operation of the third embodiment will be discussed. First, two grasping brackets 99 are attached to both ends of side brackets 97 of steering member 5, respectively. More specifically, each bracket body 101 is set so that contacting plate 105 of bracket body 101 is placed at a position rearward of installation portion 151 of side bracket 97. By frontwardly and downwardly moving grasping bracket 99, second bent portion 135 of inner bracket 103 is inserted into cutout 157 of installation portion 151, and third bent portion 141 of inner bracket 103 is inserted into insertion through-hole 159 of installation portion 151. Thereafter, second bent portion 137 is inserted into cutout 159a. FIG. 23A shows a condition that the above-mentioned operation has been executed. Under this condition, receiving hook 163 of longitudinal plate 107 of bracket body 101 receives flange portion 161 of side bracket 97, as shown in FIG. 22, although receiving hook 163 is omitted in FIGS. 23A and 23B.

When inner bracket 103 is set as shown in FIG. 23A, connecting hooks 143 and 145 of inner bracket 103 are not connected with connecting holes 147 of side bracket 97, and guide holes 124 and 126 of inner bracket 103 are frontward offset by a dimension m relative to grasping holes 109 of bracket body 101.

Figure 19:
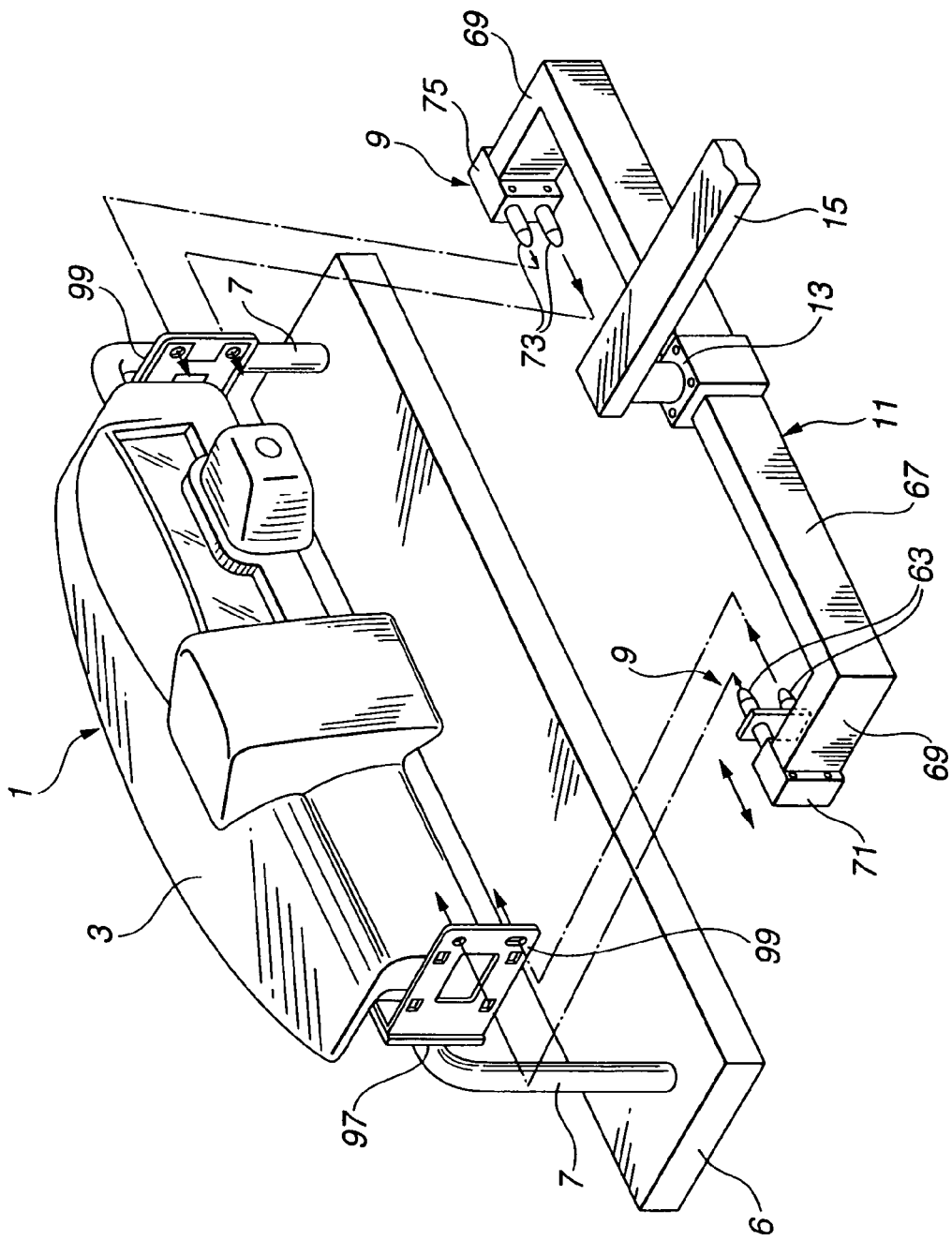
FIG. 19 is a perspective view showing a third embodiment of the installation apparatus according to the present invention.

Next, installation hand 11 shown in FIG. 19 is moved such that grasping pins 63 and 73 of right and left jigs 9 are placed at laterally outside positions of right and left grasping brackets 99. Then, right-hand-side grasping pins 73 are connected to right-hand-side grasping bracket 9, and left-hand-side grasping pins 63 are moved toward left-hand-side grasping bracket 99 by driving actuator 71 so that installation hand 11 grasps cockpit module 1.

The operation during when right-hand-side grasping pins 73 are connected to grasping bracket 99 is basically the same as that during when left-hand-side grasping pins 63 are connected to grasping bracket, only the operation of the left-hand-side grasping pins 63 will be discussed with reference to FIGS. 21 to 23.

Figure 23B:
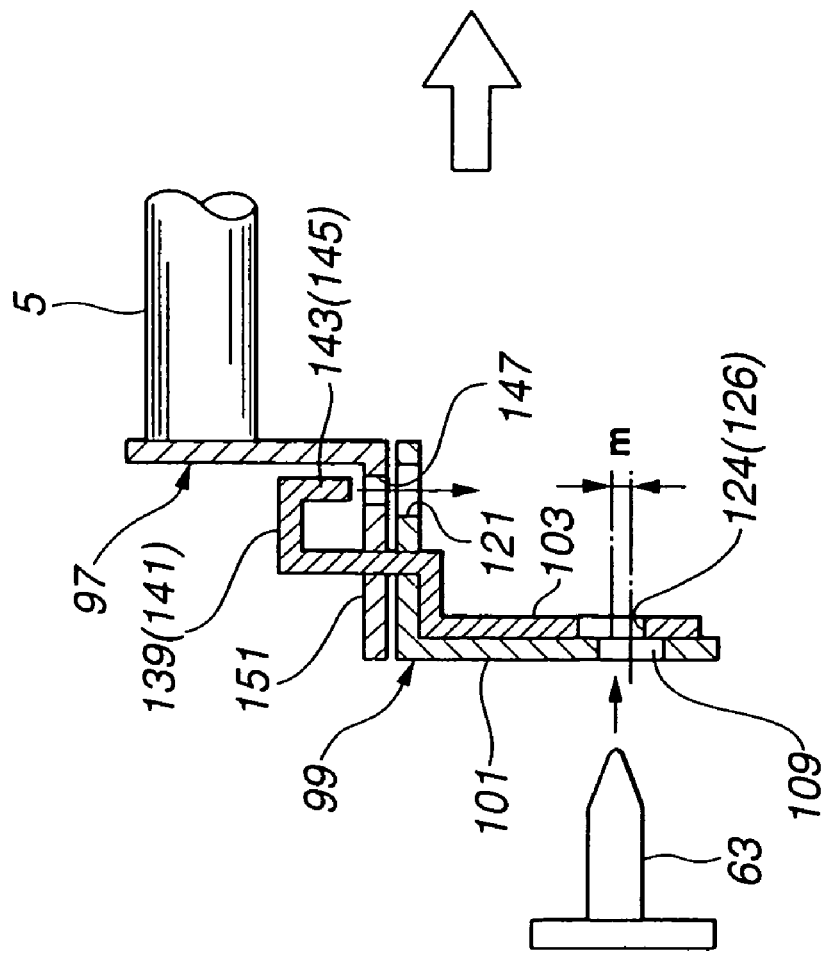
FIG. 23B is a cross sectional view showing a secured state of the grasping bracket to the side bracket.

Under the condition shown in FIG. 23A, by moving grasping pins 63 in the inner direction of the vehicle body, grasping pins 63 are inserted into grasping holes 109 of bracket body 101 and guide holes 124 and 126 of inner bracket 103, sequentially. By this insertion of grasping pins 63 into guide holes 124 and 126, inner bracket 103 moves in the rearward direction of the vehicle body since guide holes 124 and 126 are offset relative to grasping holes 109 of bracket body 101. As a result, connecting hooks 143 and 145 of inner bracket 102 are inserted into connecting holes of side bracket 97 and connecting holes 121 of bracket body 101, as shown in FIG. 23B.

By these above-discussed operations, third bent portions 139 and 141 of inner bracket 103 are fittingly in contact with installation portion 151 of side bracket 97. Accordingly, grasping bracket 99 is certainly supported by side bracket 97 of steering member 5, and installation hand 11 grasps cockpit module 1 through grasping brackets 99.

When grasping pins 63 are inserted into grasping holes 109, receiving hook 163 of bracket body 101 receives flange portion 161 of side bracket 97. Accordingly, bracket body 101 is protected from inclining toward the inserting direction of grasping pins 63, and thereby enabling to certainly execute an inserting operation of grasping pins 63 into grasping holes 109.

Figure 24:
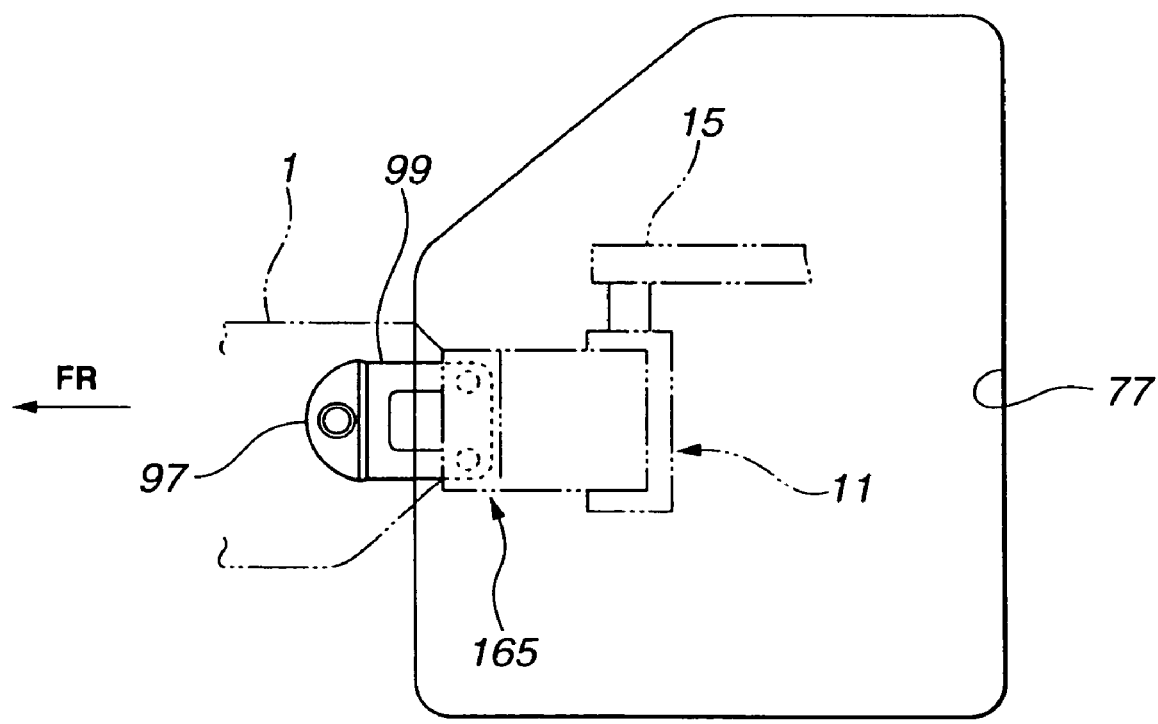
FIG. 24 is an explanatory view showing a positional relationship of the cockpit module relative to a front-door opening of the vehicle body.

When installation hand 11 grasps cockpit module 1 by these connection of grasping pins 63 and 73 with grasping brackets 99, cockpit module 1 is conveyed into the vehicle body rough front-door opening 77 by manipulating installation hand 11, as shown in FIG. 24.

After cockpit module 1 is conveyed in the vehicle body, cockpit module 1 is provisionally supported by the vehicle body by moving cockpit module 1 in the frontward direction of the vehicle body so as to insert the positioning pins of the vehicle-body brackets into positioning holes 153 of side brackets 97 and positioning holes 115 of grasping brackets 99.

During this operation, almost whole part of cockpit module 1 is located outside of front-door opening 77 as viewed from a laterally outside of front-door opening 77. Located inside of front-door opening 77 are a grasping portion 165 between grasping bracket 99 and an inserting portion between grasping pins 63 and 73 and grasping holes 109. Therefore, even when cockpit module 1 is installed in the vehicle body so that almost all of cockpit module 1 is not exposed within front-door opening 77, it is possible to install cockpit module 1 in the vehicle body by grasping cockpit module 1 by means of grasping pins 63 and 73 of installation jigs 9. This method enables installation jigs 9 to be commonly used with a case that a cockpit module is largely exposed from front-door opening 77. That is, it is not necessary to specifically prepare installation jigs 9 for the case of a different cockpit module whose almost all part is not exposed to front-door opening. This utility suppresses the production cost of vehicles.

After cockpit module 1 is provisionally supported by the vehicle body, grasping pins 63 and 73 are removed from grasping holes 109 by outwardly moving left-hand-side grasping pins 63 through the operation of actuator 71 and by moving installation hand 11. Then, installation hand 11 is rearwardly moved until there is no interference between installation jigs 9 and grasping brackets 99. Thereafter, installation hand 11 is moved outside of the vehicle body.

Under this jig removed condition, two bolts are inserted into bolt holes 155 of each side bracket 97 through work holes 117 of each grasping bracket 99, and are tightened with threaded holes of each vehicle-body bracket.

Although installation portion 151 of side bracket 97 is fittingly in contact with the vehicle-body bracket, grasping bracket 99 is attached to side bracket 99. Therefore, it is necessary that the vehicle-body bracket has recess portions for enabling third bent portions 139 and 141 of inner bracket 103 from being smoothly detached from side bracket 97 without interference with the vehicle-body bracket.

When grasping pins 63 and 73 are removed from grasping holes 109, grasping pins 63 is from guide holes 124 and 126 by moving from a state shown in FIG. 23B toward the left-hand-side direction in FIG. 23B. Further, grasping pins 73 are moved in the right hand side to remove grasping pins 73 from guide holes 124 and 126. By these removing operation, inner bracket 103 moves in the frontward direction relative to bracket body 101 and is set in the state shown in FIG. 23A. Under this pin-released state, grasping bracket 99 is easily detached from side bracket 97 by moving grasping bracket 99 by inversely executing the process of the installation operation of grasping bracket 99 to side bracket 97. Such detached grasping brackets 99 are employed in the next installation operation of cockpit module 1.

Referring to FIGS. 25 to 28D, there is shown a fourth embodiment of the installation apparatus according to the present invention.

Figure 25:
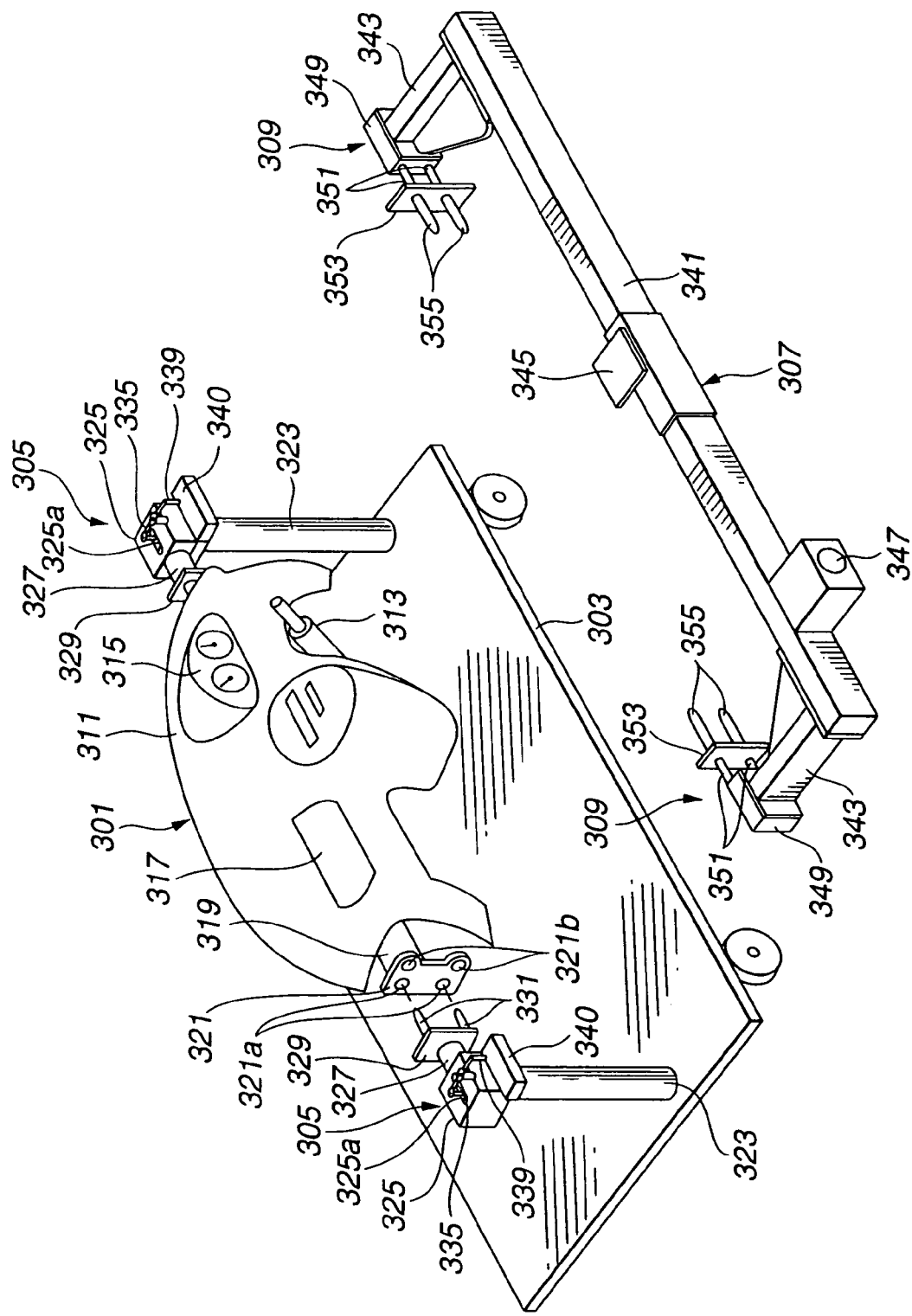
FIG. 25 is a perspective view showing the installation apparatus for grasping the cockpit module for the vehicle in according with a fourth embodiment of the present invention.

As shown in FIG. 25, the installation apparatus comprises a pair of work supporting jigs 305 which support a cockpit module 301 on a supply table 303, and a pair of work installation jigs 309 which receives cockpit module 301 supported by work supply jigs 305. The pair of installation jigs 309 are installed respectively at both end portions of an installation hand 307 through which cockpit module 301 is conveyed into a predetermined position in a passenger compartment in the vehicle.

Cockpit module 301 is constructed by assembling various parts such as an installment panel 311, a steering apparatus (column shaft) 313, a meter unit 315, a passenger-seat airbag unit 317, various control units, a music center and various harnesses around a steering member 319. Steering member 319 is a reinforcement improves a supporting rigidity of a steering column. Steering member 319 extends in the lateral direction of the vehicle body and is secured to the lateral right and left sides of the vehicle body when cockpit module is installed in the vehicle body. Further, according to a used country, arrangements of installment panel 311, column shaft 313, meter unit 315 and passenger-seat airbag unit 317 are symmetrically changed.

A pair of side brackets 321 are connected at both end portions of steering member 319, respectively. First upper and lower connecting holes 321a are formed at frontward upper and lower positions of each side bracket 321. Each work jig 305 is connectable with steering member 319 through first upper and lower connecting holes 321a of each side bracket 321. Second upper and lower connecting holes 321b are formed at rearward upper and lower positions of each side bracket 321. Each installation jig 309 is connectable with steering member 319 through second upper and lower connecting holes 321b of each side bracket 321.

These work connecting holes 321a and 321b are located respectively at positions which are seen from a lateral outside of the vehicle body through a front-door opening even when cockpit module 301 is installed in the vehicle body. Therefore, installation hand 307 is smoothly manipulated to grasp side brackets 321 without generating the interference with the vehicle body.

Figure 26:
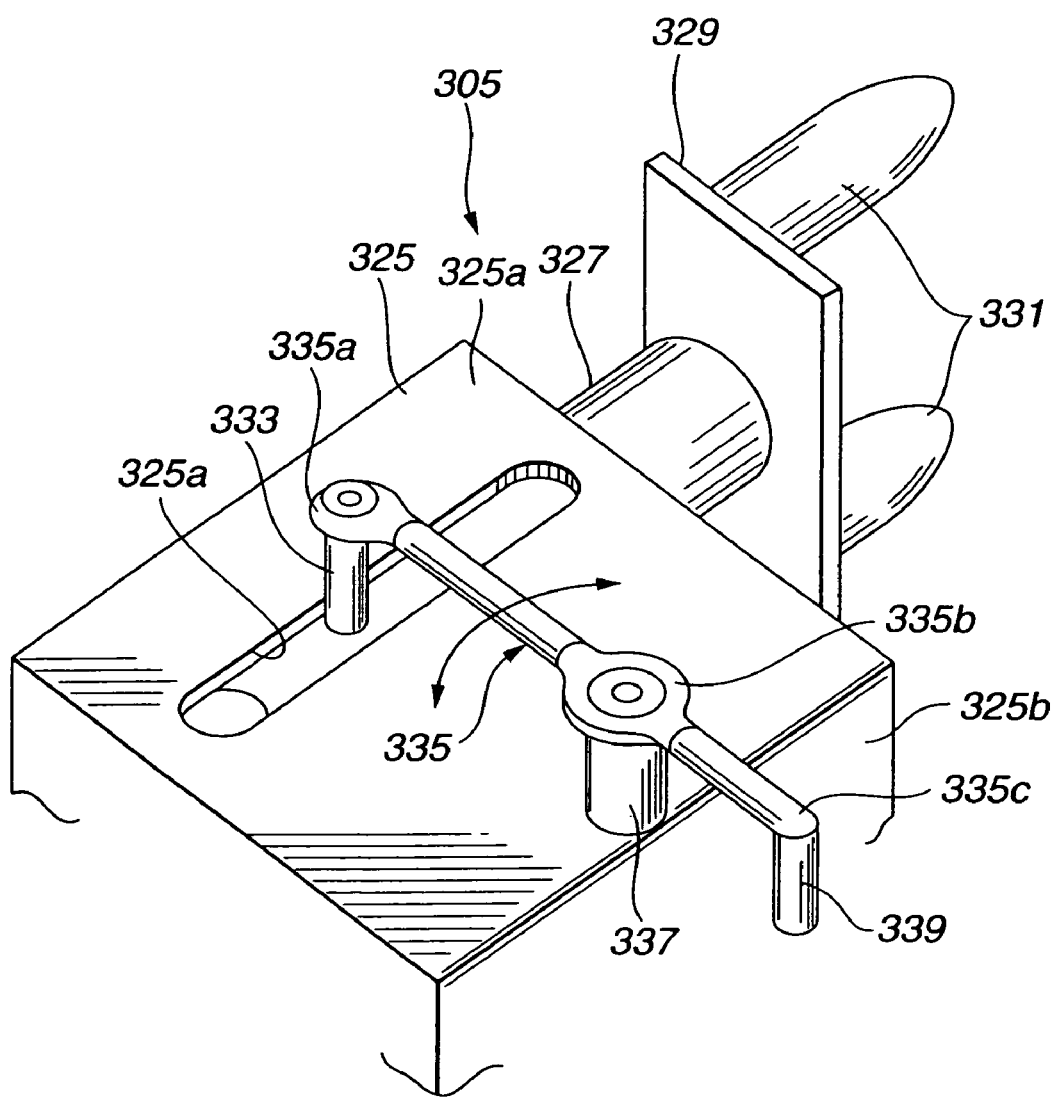
FIG. 26 is an enlarged perspective view showing a detail of a left-hand-side work supply jig shown in FIG. 25.

Each work supply jig 305 is disposed on an upper end of each stand 323 standing from supply truck 303. As shown in FIG. 26, work supply jig 305 comprises a block 325 and a movable member 327 which projects from block 325 toward cockpit module 301. Movable member 327 moves in the lateral direction along the axis of steering member 319. A plate 329 is installed at an end of movable member 327. A pair of connecting pins 331 project plate 329 toward cockpit module 301 and function as a work supporting portion.

An opening 325a is formed at an upper surface 325a of block 325, and an end 335a of an interlock link 335 is rotatably connected to a supporting pin 333 secured to movable member 327 through opening 325a. An intermediate portion 335b of interlock link 335 is rotatably supported by a rotation support shaft 337 standing from block 325. A vertical pin 339 extends from the other end 335c of interlock link 335 in the downward direction.

A positioning plate 340 is integrally formed on a lower portion of a rear side surface 325b of block 325. Positioning plate 340 functions as a positioning means for positioning work installation jig 309 of installation hand 307 relative to cockpit module 301 supported by work supply jig 305 in order to support cockpit module 301 by installation hand 307.

Installation hand 307 comprises a hand body 341 and right and left jig arms 343. Hand body 341 extends in the lateral direction of the vehicle body when cockpit module 301 is installed in the vehicle body. Right and left jig arms 343 project from right and left ends of hand body 341 toward the frontward direction of the vehicle body. Work installation jig 309 is installed at an end of each jig arm 343. An installation portion 345, in which an air-balancer type power assist apparatus is installed, is formed at an intermediate portion of hand body 341. A control button 347 for controlling work installation jigs 309 is provided in the vicinity of left-hand-side jig arm 343 in FIG. 25.

Each work installation jig 309 comprises an actuator 349 constituted by a motor and a cylinder fixed at a tip end of each jig arm 343. Actuator 349 comprises two drive rods 351 which are movable along the longitudinal direction of hand body 341, that is, along the axial direction of steering member 319. Pin supporting plate 353 is installed at both ends of drive rods 351, and two jig connecting pins 355 project from pin supporting plate 353 toward the opposite pins 355 of the other side. Jig connecting pins 355 are inserted into second work holes 321b of cockpit module 301 to convey cockpit module 301 in the vehicle body by means of installation hand 307. As shown in FIG. 27, installation hand 307 supports cockpit module 301 by inserting jig connecting pins 355 into second work connecting holes 321b.

With reference to FIGS. 28A to 28D, a work installation operation using the installation apparatus of the fourth embodiment will be discussed. FIGS. 28A to 28D show left-hand-side work installation jig 305 which is symmetry with right-hand-side one. Herein, only the explanation as to the left-hand-side one will be done since right-hand-side work installation jig 305 also performs the operation as same as that of the left-hand-side one.

Figure 28A:
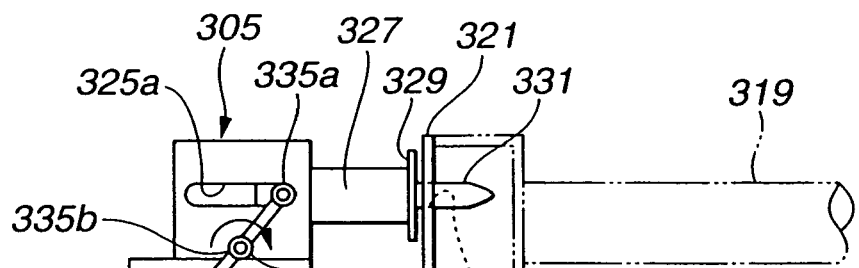
FIGS. 28A to 28D are explanatory views showing cockpit-module installation operations by the installation apparatus.

As shown in FIG. 28A, work supply jig 305 on supply table 303 is moved toward cockpit module 301, and two connecting pins 331 are connected with first work holes 321a of side bracket 321. By projectingly moving movable member 327 toward cockpit module 301, link mechanism 335 rotates clockwise around rotation support shaft 337, and therefore the other end 335c of link mechanism 335 is moved toward the left hand side in FIG. 28A.

Figure 28B:
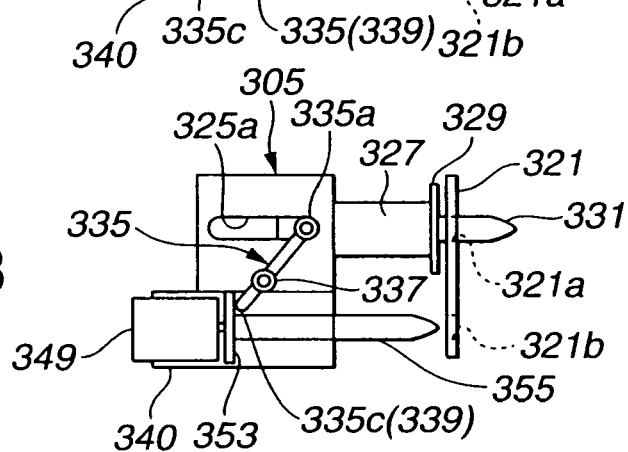

Under this state, by moving installation hand 307 supported by the power-assist arm, actuators 349 of both work installation jigs 309 are set on positioning plates 340, respectively in order to correctly position work installation jigs 309 relative to cockpit module 301, as shown in FIG. 28B. Under this state, pin supporting plate 353 connected to actuator 349 is placed at a left-hand-side position relative to contact pin 339 formed at the other end 335c of link mechanism 335 as shown in FIG. 28B.

Figure 28C:
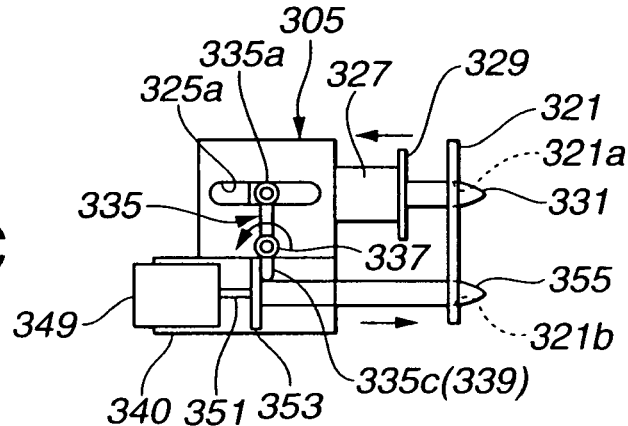

Next, by controlling control button 347 installed at installation hand 307, actuator 349 is driven to move drive rod 351 toward cockpit module 301, that is, in the right hand side direction in FIG. 28C in case of left hand side one. According to this approaching movement, pin supporting plate 353 and jig connecting pins 355 are also moved toward cockpit module 301. By this operation, pin supporting plate 353 is contacted with contact pin 339 of link mechanism 335, and link mechanism 335 is rotated in anticlockwise direction around rotation support shaft 337. Simultaneously, jig connecting pins 355 are inserted into second work connecting holes 321b of each side bracket 321 as shown in FIG. 28C. By the anticlockwise rotation of link mechanism 335, movable member 327 is moved in the left hand side as shown in FIG. 28C, and jig connecting pins 331 are also moved in the left hand side together with movable member 327.

During the operation from the state shown in FIG. 28B to the state shown in FIG. 28C, after jig connecting pins 355 are inserted into second work connecting holes 321b, supply jig connecting pins 331 are detached (removed) from first work connecting holes 321a. That is, the positional relationship among parts of the work assembly apparatus are set so that the above-discussed sequential operations are certainly executed.

Accordingly, it becomes possible that work installation jigs 309 certainly receive cockpit module 1 supported by work supply jigs 305 as a result of the above-discussed operation. Further, the inserting operation of installation jig connecting pins 355 into second work holes 321b is executed under a condition that each actuator 349 is positioned on each positioning plate 340. This enables the inserting operation to be certainly executed.

Figure 28D:
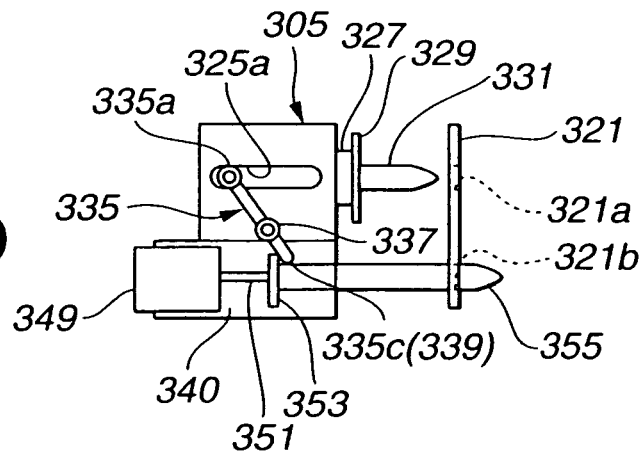

When installation jig connecting pins 355 are completely inserted into second work connecting holes 321b by further moving installation jig connecting pins 355 toward cockpit module 301 from the state of FIG. 28C, supply jig connecting pins 331 are completely removed (detached) from first work holes 321a, as shown in FIG. 28D. By this operation, it becomes possible to detach cockpit module 1 supported by work installation jigs 309 from supply table 303 by grasping cockpit module 301 as shown in FIG. 27.

Cockpit module 301 detached from supply truck 303 is properly conveyed into the vehicle body through front-door opening and is installed at the dash portion of the vehicle body, by manipulating installation hand 307.

After the installation of cockpit module 301, installation jig supply pins 355 are removed from second work connecting holes 351 by outwardly moving driving rods 351 of actuator 349 through the operation of control button 347 by the operator. Then, installation hand 307 is moved outside of the vehicle body to enable the execution of the next installation operation.

With the thus arrange work assembly method employing the installation apparatus of the fourth embodiment, the operation for transferring cockpit module 301 from work supply jigs 305 to work installation jigs 309 is executed by operating actuator 349 in a manner that when installation jig connecting pins 355 of each work installation jig 309 are inserted into second work connecting holes 321b of cockpit module 301, supply jig connecting pins 331 of each work-supply jig 305 are removed from second work connecting holes 321b of cockpit module 301 through link mechanism 335.

This eliminates the operation from executing the releasing operation of releasing both work supply jigs 305 and the pin detaching operation for removing supply jig connecting pins 331 from first work connecting holes 321a of each side bracket 321. Further, this facilitates the transferring operation of cockpit module 301 from work-supply jigs 305 to work installation jigs 309.

Since work supply jigs 305 of the installation apparatus of the fourth embodiment employ no actuator and no sensor, the installation apparatus of the fourth embodiment according to the present invention is constructed without complicating the structure thereof.

Although the fourth embodiment has been shown and described such that installation jig connecting pins 355 of both installation jigs 309 are constructed to be driven by actuators 349, respectively, one of actuators 349 may be eliminated as shown in FIG. 29. In such a modification of the fourth embodiment wherein actuator 349 is installed only at the left-hand-side end of installation hand 307 as shown in FIG. 29, installation jig connecting pins 355 installed at a right-hand-side end of installation hand 307 are inserted into second work connecting holes 321b by manipulating installation hand 307.

This application is based on Japanese Patent Applications No. 2001-352060 filed on Nov. 16, 2001, No. 2001-159344 filed on May 28, 2001 and No. 2001-133508 filed on Apr. 27, 2001 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An installation apparatus of a vehicle cockpit module comprising:
    an installation jig for installing a cockpit module in a vehicle body, the installation jig comprising a pair of attachments configured to grasp both end portions of a steering member of the cockpit module, the attachments being installed respectively at both ends of an installation hand of the installation jig,
    connecting pins that extend along an axial direction of the cockpit module installed at either each end portion of the steering member or each attachment, and
    connecting grooves formed in the other of each end portion of the steering member and each attachment, wherein the connecting pins are configured to engage with a connecting groove when the installation hand grasps the cockpit module,
    wherein each connecting groove is formed into a slot which extends such that a frontward portion of the slot relative to a longitudinal direction of the vehicle body is higher in a vertical direction than a rearward portion of the slot,
    wherein each of the attachments of the installation jig includes a first attachment surface adapted to be contacted in the longitudinal direction of the vehicle body with a first steering member surface formed at the corresponding end portion of the steering member when the attachments move in the frontward direction of the vehicle body so as to allow the connecting pin engaged with the connecting groove to move along the connecting groove in order to grasp the cockpit module,
wherein an attachment further includes a second attachment surface adapted to be contacted in a wide direction of the vehicle body with a second steering member surface further formed at the corresponding end portion of the steering member.

2. The installation apparatus as claimed in claim 1, wherein a connecting pin is installed on one of the second attachment surface of the attachment and the second steering member surface of the end portion of the steering member, and a connecting groove is formed in the other of the second attachment surface of the attachment and the second steering member surface of the end portion of the steering member.

* * * * *